(12) United States Patent
Noguchi

(10) Patent No.: US 11,556,582 B2
(45) Date of Patent: Jan. 17, 2023

(54) IMAGE PROCESSING APPARATUS, IMAGE PROCESSING METHOD, IMAGE PROCESSING PROGRAM, AND RECORDING MEDIUM STORING PROGRAM

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 262 days.

(21) Appl. No.: 17/087,036

(22) Filed: Nov. 2, 2020

(65) Prior Publication Data

US 2021/0049201 A1 Feb. 18, 2021

Related U.S. Application Data

(63) Continuation of application No. PCT/JP2019/017385, filed on Apr. 24, 2019.

(30) Foreign Application Priority Data

Jun. 1, 2018 (JP) .............................. JP2018-105976
Sep. 25, 2018 (JP) .............................. JP2018-178638

(51) Int. Cl.
*G06F 16/00* (2019.01)
*G06F 16/532* (2019.01)
(Continued)

(52) U.S. Cl.
CPC ............ *G06F 16/532* (2019.01); *G06F 16/55* (2019.01); *G06F 16/5866* (2019.01); *G06K 9/6215* (2013.01); *G06T 11/60* (2013.01)

(58) Field of Classification Search
CPC ....................................................... G06F 16/55
See application file for complete search history.

(56) References Cited

U.S. PATENT DOCUMENTS

2011/0026773 A1\* 2/2011 Sumitomo ................ G06T 1/00
382/106
2011/0052069 A1 3/2011 Nakabayashi et al.
(Continued)

FOREIGN PATENT DOCUMENTS

JP 2011-048668 A 3/2011
JP 2013-033453 A 2/2013
(Continued)

OTHER PUBLICATIONS

Anonymous, "k-means clustering", May 27, 2018, pp. 1-14, XP055817655, Retrieved from the Internet: URL:https://en.wikipedia.org/w/index.php?title=K-means_clustering&oldid=843196206.
(Continued)

*Primary Examiner* — Ajith Jacob
(74) *Attorney, Agent, or Firm* — Studebaker & Brackett PC

(57) ABSTRACT

An image processing apparatus, an image processing method, a program, and a recording medium storing the program capable of extracting, from an input first image group, an image similar to an image extracted from a reference image group are provided. A first image group including a plurality of images of a user is transmitted to an order reception server. A second image group similar to the first image group is searched from a plurality of reference image groups stored in the order reception server. An image similar to an image previously extracted from the second image group is extracted from the first image group. An album is generated by arranging the image extracted from the first image group in a layout similar to a layout of an album generated from the second image group.

21 Claims, 30 Drawing Sheets

(51) Int. Cl.
  *G06F 16/55*  (2019.01)
  *G06F 16/58*  (2019.01)
  *G06K 9/62*   (2022.01)
  *G06T 11/60*  (2006.01)

(56) References Cited

U.S. PATENT DOCUMENTS

| | | |
|---|---|---|
| 2013/0004073 A1 | 1/2013 | Yamaji et al. |
| 2016/0078322 A1 | 3/2016 | Yamaji et al. |
| 2016/0253357 A1 | 9/2016 | Furuya |

FOREIGN PATENT DOCUMENTS

| | | |
|---|---|---|
| JP | 2013-109578 A | 6/2013 |
| JP | 2015-125554 A | 7/2015 |
| JP | 2016-062122 A | 4/2016 |

OTHER PUBLICATIONS

The extended European search report issued by the European Patent Office dated Jul. 2, 2021, which corresponds to European Patent Application No. 19811723.6-1213 and is related to U.S. Appl. No. 17/087,036.

An Office Action; "Notice of Reasons for Refusal," mailed by the Japanese Patent Office dated Nov. 24, 2021, which corresponds to Japanese Patent Application No. 2020-521801 and is related to U.S. Appl. No. 17/087,036 with English language translation.

\* cited by examiner

FIG. 23
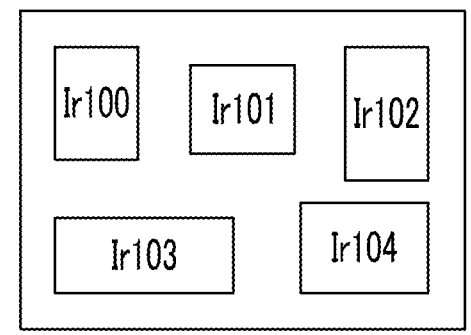
FIRST PAGE
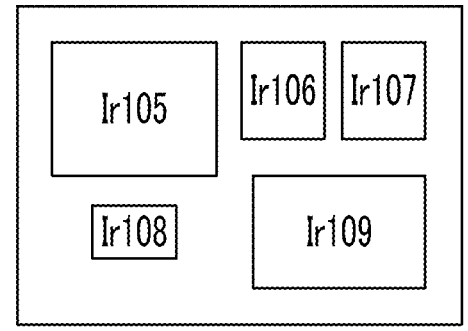
SECOND PAGE
CONSULTATION ALBUM Ab1
(TEMPLATE T1)
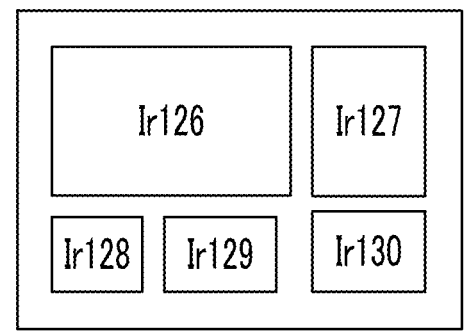
SIXTH PAGE

IMAGE PROCESSING APPARATUS, IMAGE PROCESSING METHOD, IMAGE PROCESSING PROGRAM, AND RECORDING MEDIUM STORING PROGRAM

CROSS-REFRENCE TO RELATED APPLICATIONS

This application is a Continuation of PCT International Application No. PCT/JP2019/017385 filed on Apr. 24, 2019, which claims priority under 35 U.S.C. § 119(a) to Japanese Patent Applications No. 2018-0105976 filed on Jun. 1, 2018 and No. 2018-178638 filed on Sep. 25, 2018. Each of the above application(s) is hereby expressly incorporated by reference, in its entirety, into the present application.

BACKGROUND OF THE INVENTION

1. Field of the Invention

The invention relates to an image processing apparatus, an image processing method, an image processing program, and a recording medium storing the program.

2. Description of the Related Art

In a case of generating an album from multiple images, images to be used in the album have to be selected. However, it is difficult for a general user to know which image is to be selected. In the related art, for example, it is considered that a reprint can be created in accordance with requirements of a customer (JP2003-288350A), an image similar to a diagnosis target is searched from multiple images (JP2005-065728A), a layout template appropriate for preference of a user is created using a theme used in the past (JP2014-085814A), an image is searched using an image feature amount (JP2016-162963A), and a tomographic image is extracted (JP2017-127474A).

SUMMARY OF THE INVENTION

However, in the disclosure of JP2003-288350A, an image appropriate for the reprint is found for one image. In the disclosure of JP2005-065728A, one image is found from multiple images. Thus, any of these disclosures is not appropriate for extracting a part of images from an image group including a plurality of images. In the disclosure of JP2014-085814A, the layout template is created. In the disclosure of JP2016-162963A, an image is searched using the image feature amount. In the disclosure of JP2017-127474A, the tomographic image is extracted from a tomographic image group. Thus, these disclosures are not appropriate for extracting a part of images from an image group including a plurality of images.

An object of the invention is to extract, from an input first image group, an image similar to an image previously extracted from a reference image group.

An image processing apparatus according to a first invention comprises a reference image group reception device (reference image group reception means) that receives an input of a plurality of reference image groups (instead of the reference image groups, may be feature amounts representing a plurality of images included in the reference image groups), a first image extraction device (first image extraction means) that extracts a part of images from each of the plurality of reference image groups, a first image group reception device (first image group reception means) that receives an input of a first image group (instead of the first image group, may be feature amounts representing a plurality of images included in the first image group), an image group search device (image group search means) that searches for a second image group (instead of the second image group, may be feature amounts representing a plurality of images included in the second image group) similar to the first image group from the plurality of reference image groups, and a second image extraction device (second image extraction means) that extracts, from the first image group, an image similar to the part of the images extracted from the second image group.

The first invention also provides an image processing method appropriate for the image processing apparatus. That is, this method comprises receiving, by a reference image group reception device (reference image group reception means), an input of a plurality of reference image groups, extracting, by a first image extraction device (first image extraction means), a part of images from each of the plurality of reference image groups, receiving, by a first image group reception device (first image group reception means), an input of a first image group, searching, by an image group search device (image group search means), for a second image group similar to the first image group from the plurality of reference image groups, and extracting, by a second image extraction device (second image extraction means), from the first image group, an image similar to the part of the images extracted from the second image group.

The image processing apparatus according to the first invention may comprise a processor that performs receiving an input of a plurality of reference image groups, extracting a part of images from each of the plurality of reference image groups, receiving an input of a first image group, searching for a second image group similar to the first image group from the plurality of reference image groups, and extracting, from the first image group, an image similar to the extracted part of the images.

The first invention also provides a computer-readable program controlling a computer of the image processing apparatus and a recording medium storing the program.

For example, extraction in the first image extraction device is processing used for arranging the extracted part of the images in an album. In this case, the image processing apparatus may further comprise an image arrangement device (image arrangement means) that arranges, in the album, the image extracted in the second image extraction device.

For example, the image arrangement device arranges, in the album, the image extracted in the second image extraction device based on information about an album in which the part of the images extracted from the second image group is arranged.

For example, the information about the album is at least one of layout information about the album or template information about the album.

For example, the image arrangement device arranges, in the album, the image extracted in the second image extraction device by prioritizing matching between a page order of the album and a time series of a capturing date and time of the image over arrangement of the image based on the layout information about the album.

The image processing apparatus may further comprise a rearrangement device (rearrangement means) that obtains a middle capturing date and time of capturing dates and times of images arranged on each page of the album and rearranges the pages of the album such that the middle capturing date and time are in a time-series order.

The image processing apparatus may further comprise a first image replacement device (first image replacement means) that replaces an image arranged on one page with another image such that a capturing date and time of the image arranged on one page of the album is earlier than the middle capturing date and time of capturing dates and times of images arranged on subsequent pages.

The image processing apparatus may further comprise a second image replacement device (second image replacement means) that replaces an image arranged on one page with another image such that a capturing date and time of the image arranged on one page of the album is later than the middle capturing date and time of capturing dates and times of images arranged on previous pages.

The image processing apparatus may further comprise a third image replacement device (third image replacement) that replaces an image arranged on one page with another image such that a capturing date and time of the image arranged on one page of the album is earlier than an initial capturing date and time of images arranged on subsequent pages.

The image processing apparatus may further comprise a fourth image replacement device (fourth image replacement means) that replaces an image arranged on one page with another image such that a capturing date and time of the image arranged on one page of the album is later than a last capturing date and time of images arranged on previous pages.

For example, the image arrangement device arranges, in the album, the image extracted in the second image extraction device by prioritizing matching of a time series of a capturing date and time of the image over arrangement of the image based on layout information about the album for arrangement of the image in one page of the album.

For example, the image arrangement device arranges, in the album, the image extracted in the second image extraction device by prioritizing arrangement of the image based on layout information about the album over matching between a page order of the album and a time series of a capturing date and time of the image.

For example, the image arrangement device arranges, in the album, the image extracted in the second image extraction device by prioritizing arrangement of the image based on layout information about the album over matching of a time series of a capturing date and time of the image for arrangement of the image in one page of the album.

For example, the image group search device, in each reference image group of the plurality of reference image groups, divides images included in the reference image group into a first small group collection of similar images, divides images included in the first image group into a second small group collection of similar images, and searches for a reference image group for which a degree of matching between the first small group collection and the second small group collection is greater than or equal to a first threshold value as the second image group similar to the first image group.

For example, the image group search device combines small groups in a case where similarity between small groups included in the first small group collection is greater than or equal to a second threshold value, and combines small groups in a case where similarity between small groups included in the second small group collection is greater than or equal to the second threshold value.

An image processing apparatus according to a second invention comprises a first image group reception device (first image group reception means) that receives an input of a first image group, an image group search device (image group search means) that searches for a second image group similar to the first image group from a plurality of reference image groups each having information about an extracted part of images, and an image extraction device (image extraction means) that extracts, from the first image group, an image similar to the part of the images extracted from the second image group searched by the image group search device.

The second invention also provides an image processing method appropriate for the image processing apparatus. That is, this method comprises receiving, by a first image group reception device (first image group reception means), an input of a first image group, searching, by an image group search device (image group search means), for a second image group similar to the first image group from a plurality of reference image groups each having information about an extracted part of images, and extracting, by an image extraction device (image extraction means), from the first image group, an image similar to the part of the images extracted from the second image group searched by the image group search device.

Even in the second invention, the image processing apparatus may comprise a processor that performs receiving an input of a first image group, searching for a second image group similar to the first image group from a plurality of reference image groups each having information about an extracted part of images, and extracting, from the first image group, an image similar to the part of the images extracted from the searched second image group.

The second invention also provides a computer-readable program controlling a computer of the image processing apparatus and a recording medium storing the program.

A third invention is an image processing system comprising an image processing apparatus, and an image group search server, in which the image processing apparatus includes a first image group reception device (first image group reception means) that receives an input of a first image group, the image group search server includes an image group search device (image group search means) that searches for a second image group similar to the first image group from a plurality of reference image groups each having information about an extracted part of images, and at least one of the image processing apparatus or the image group search server includes an image extraction device (image extraction means) that extracts, from the first image group, an image similar to the part of the images extracted from the second image group searched by the image group search device.

An image processing apparatus according to a fourth invention comprises a first image group reception device (first image group reception device) that receives an input of a first image group, and an image extraction device (image extraction means) that, among a plurality of reference image groups each having information about an extracted part of images, extracts, from the first image group, an image similar to the part of the images extracted from a second image group similar to the first image group.

The fourth invention also provides an image processing method appropriate for the image processing apparatus. That is, this method comprises receiving, by a first image group reception device (first image group reception means), an input of a first image group, and among a plurality of reference image groups each having information about an extracted part of images, extracting, by an image extraction device (image extraction means), from the first image group, an image similar to the part of the images extracted from a second image group similar to the first image group.

Even in the fourth invention, the image processing apparatus may comprise a processor that performs receiving an input of a first image group, and among a plurality of reference image groups each having information about an extracted part of images, and the image extraction device may extract, from the first image group, an image similar to the part of the images extracted from a second image group similar to the first image group.

The fourth invention also provides a program controlling a computer of the image processing apparatus and a recording medium storing the program.

An image processing apparatus according to a fifth invention comprises a first image group input device (first image group input means) that receives an input of a first image group, and an extraction device (extraction means) that extracts, from the first image group, a plurality of images for which similarity with a plurality of consultation images extracted from a consultation image group is greater than or equal to a threshold value.

The fifth invention also provides an image processing method appropriate for the image processing apparatus. That is, this method comprises receiving, by a first image group input device (first image group input means), an input of a first image group, and extracting, by an extraction device (extraction means), from the first image group, a plurality of images for which similarity with a plurality of consultation images extracted from a consultation image group is greater than or equal to a threshold value.

The image processing apparatus may comprise a processor that performs receiving an input of a first image group, and extracting, from the first image group, a plurality of images for which similarity with a plurality of consultation images extracted from a consultation image group is greater than or equal to a threshold value.

The fifth invention also provides a computer-readable program controlling a computer of the image processing apparatus and a recording medium storing the program.

A plurality of the consultation image groups may be present. The image processing apparatus may further comprise a consultation image group detection device (consultation image group detection means) that detects, from the plurality of consultation image groups, the consultation image group for which similarity with the first image group is greater than or equal to a threshold value. The extraction device may extract, from the first image group, a plurality of images for which similarity with the plurality of consultation images extracted from the consultation image group detected by the consultation image group detection device is greater than or equal to a threshold value.

Each consultation image of the plurality of consultation images extracted from the consultation image group may be pasted in an image pasting region of a template. The image processing apparatus may further comprise an image pasting device (image pasting means) that pastes, in the image pasting region of the template, an image for which similarity with the consultation image pasted in the image pasting region of the template is greater than or equal to a threshold value among the plurality of images extracted in the extraction device.

For example, the image pasting device pastes, in an image pasting region corresponding to the image pasting region in which the consultation image is pasted, the image for which the similarity with the consultation image pasted in the image pasting region of the template is greater than or equal to the threshold value among the plurality of images extracted in the extraction device.

The image pasting device may paste, in an image pasting region corresponding to the image pasting region in which the consultation image is pasted, an image for which the similarity with the consultation image pasted in the image pasting region of the template is greater than or equal to the threshold value and that is captured at a timing at which an image corresponding to the consultation image is expected to be captured.

The image processing apparatus may further comprise a template designation device (template designation means) that designates one template from a plurality of templates. In this case, each consultation image of the plurality of consultation images extracted from the consultation image group may be pasted in the image pasting region of the template designated by the template designation device.

An order of the plurality of consultation images may be determined. The image processing. apparatus may further comprise a first similarity adjustment device (first similarity adjustment means) that increases the similarity with the consultation image for an image captured in an order corresponding to the order of each consultation image of the plurality of consultation images or an image captured at a timing at which an image corresponding to the consultation image is expected to be captured among images included in the first image group.

The image processing apparatus may further comprise a second similarity adjustment device (second similarity adjustment means) that increases the similarity with the consultation image for an image having information similar to information about a face included in the consultation image among images included in the first image group.

The image processing apparatus may further comprise a third similarity adjustment device (third similarity adjustment means) that increases the similarity with the consultation image for an image including a person for which the number of appearances in the image is greater than or equal to a threshold value among images included in the first image group.

The image processing apparatus may further comprise an image product creation device (image product creation means) that creates an image product using the images extracted by the extraction device.

The image processing apparatus may further comprise a person designation device (person designation means) that designates a desired person among persons appearing in images included in the first image group, and a fourth similarity adjustment device (fourth similarity adjustment means) that increases the similarity with the consultation image for an image including the person designated by the person designation device.

The image processing apparatus may further comprise a face image detection device (face image detection means) that detects a face image from the images included in the first image group, and a face image display control device (face image display control means) that controls a display device to display the face image detected by the face image detection device on a display screen. In this case, for example, the person designation device may designate the desired person by designating the face image displayed on the display screen.

According to the first invention, the second image group similar to the first image group is searched from the plurality of reference image groups, and the image similar to the image extracted from the second image group is extracted from the first image group. Thus, an image similar to an image previously extracted from the second image group is obtained from the first image group. Even in the second invention, the third invention, and the fourth invention, an image similar to an image previously extracted from the second image group is obtained from the first image group. According to the second invention, the same image as the consultation image extracted from the consultation image group can be obtained from the first image group.

BRIEF DESCRIPTION OF THE DRAWINGS

FIG. 23 illustrates a content of an album created using a consultation age extracted from a consultation image group.

DESCRIPTION OF THE PREFERRED EMBODIMENTS

FIRST EXAMPLE

Figure 1:
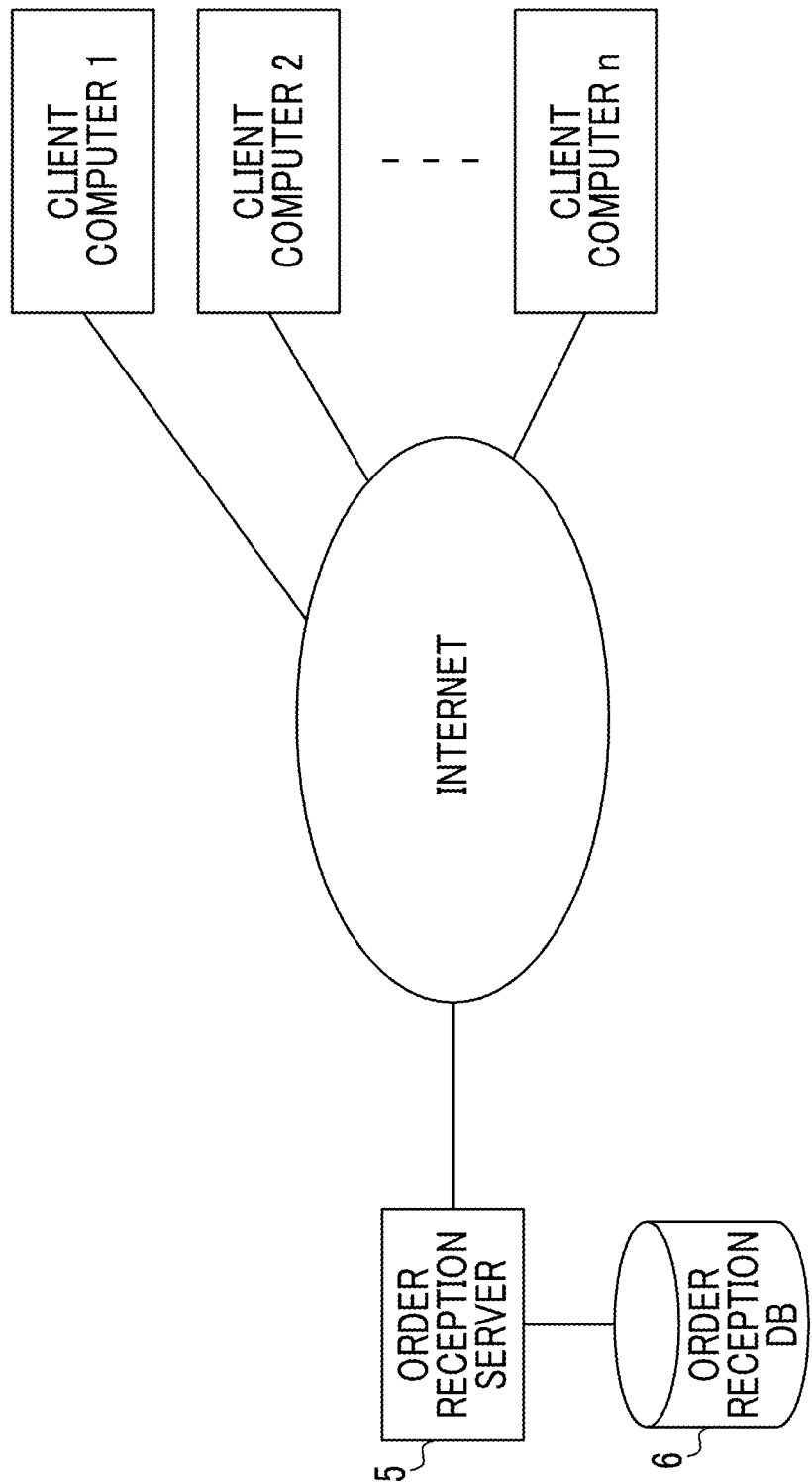
FIG. 1 illustrates a summary of an image processing system.

FIG. 1 illustrates a first example of the invention and illustrates a summary of an image processing system.

The image processing system is a system that extracts an image from a plurality of images and generates an album by laying out the extracted image on a page.

An order reception server 5 (image group search server) and n (n is a natural number) number of client computers 1 to n are connected to the Internet. An order reception database 6 is connected to the order reception server 5. Each of the client computers 1 to n and the order reception server 5 can communicate with each other. Each of the client computers 1 to n and the order reception server 5 constitute the image processing system.

An album is generated by communication between any of the client computers 1 to n and the order reception server 5.

Figure 2:
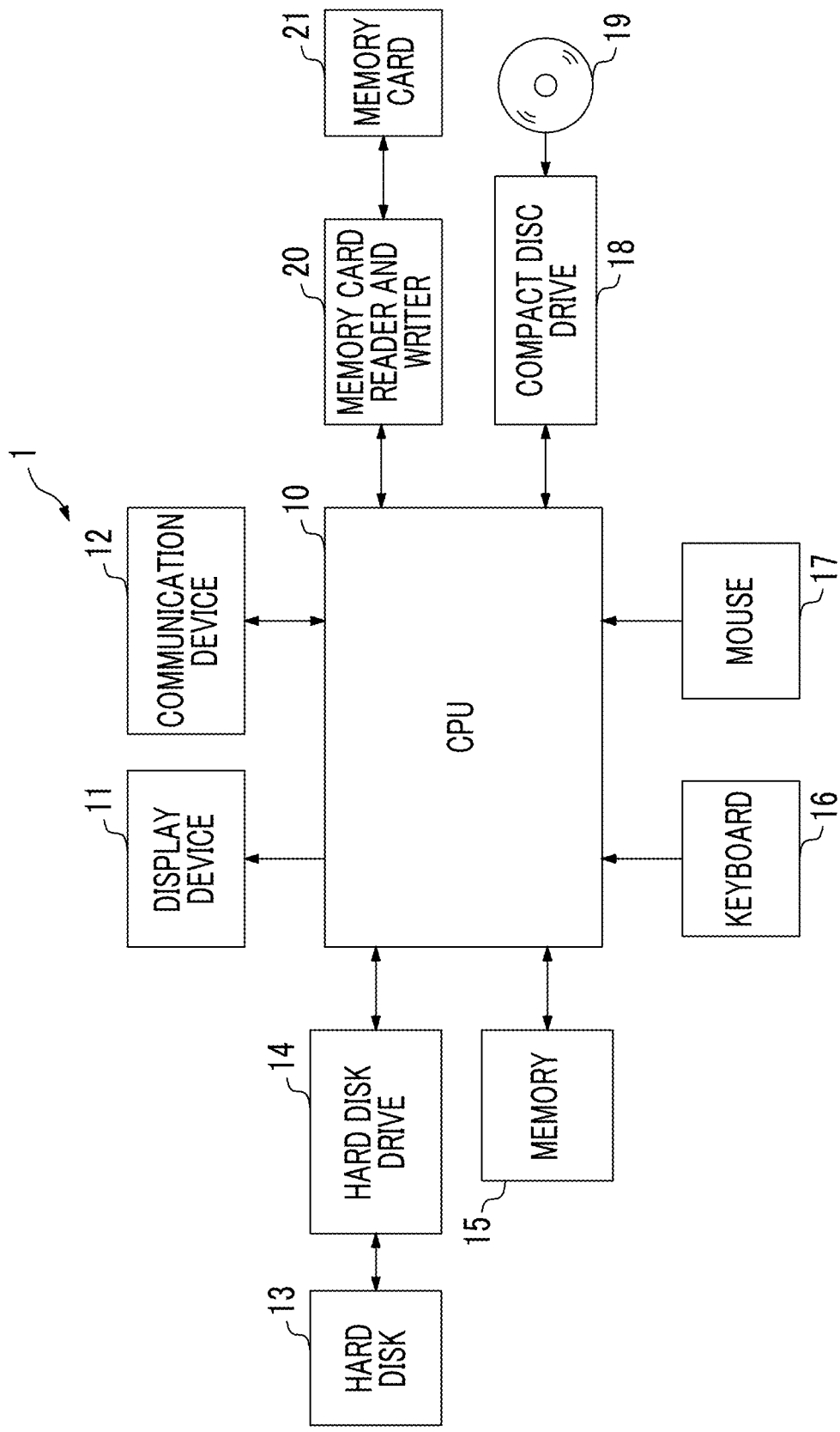
FIG. 2 is a block diagram illustrating an electric configuration of a client computer.

FIG. 2 is a block diagram illustrating an electric configuration of the client computer 1. Each of the client computers 2 to n has the same configuration as the client computer 1.

An operation of the entire client computer 1 is managed by a central processing unit (CPU) 10.

The client computer 1 includes a display device 11 that displays images and other information on a display screen, and a communication device 12 that communicates with apparatuses and the like other than the client computer 1 by connecting to the Internet and other networks. In addition, the client computer 1 includes a hard disk 13, a hard disk drive 14 that accesses the hard disk 13, a memory 15 that stores data and the like, and a keyboard 16 and a mouse 17 for inputting commands and the like. Furthermore, the client computer 1 includes a compact disc drive 18 that accesses a compact disc 19, and a memory card reader and writer 20 that writes data into a memory card 21 and reads out data recorded on the memory card 21.

An operation program of the client computer 1 described later is received in the communication device 12 through the Internet. The received operation program is installed on the client computer 1. The operation program may be recorded on a portable recording medium such as the compact disc 19 and read out from the portable recording medium instead of being received by the client computer 1 through a network such as the Internet and installed on the client computer 1. In this case, the operation program read out from the portable recording medium is installed on the client computer 1. Obviously, a computer (CPU 10) of the client computer 1 can read out the operation program.

Figure 3:
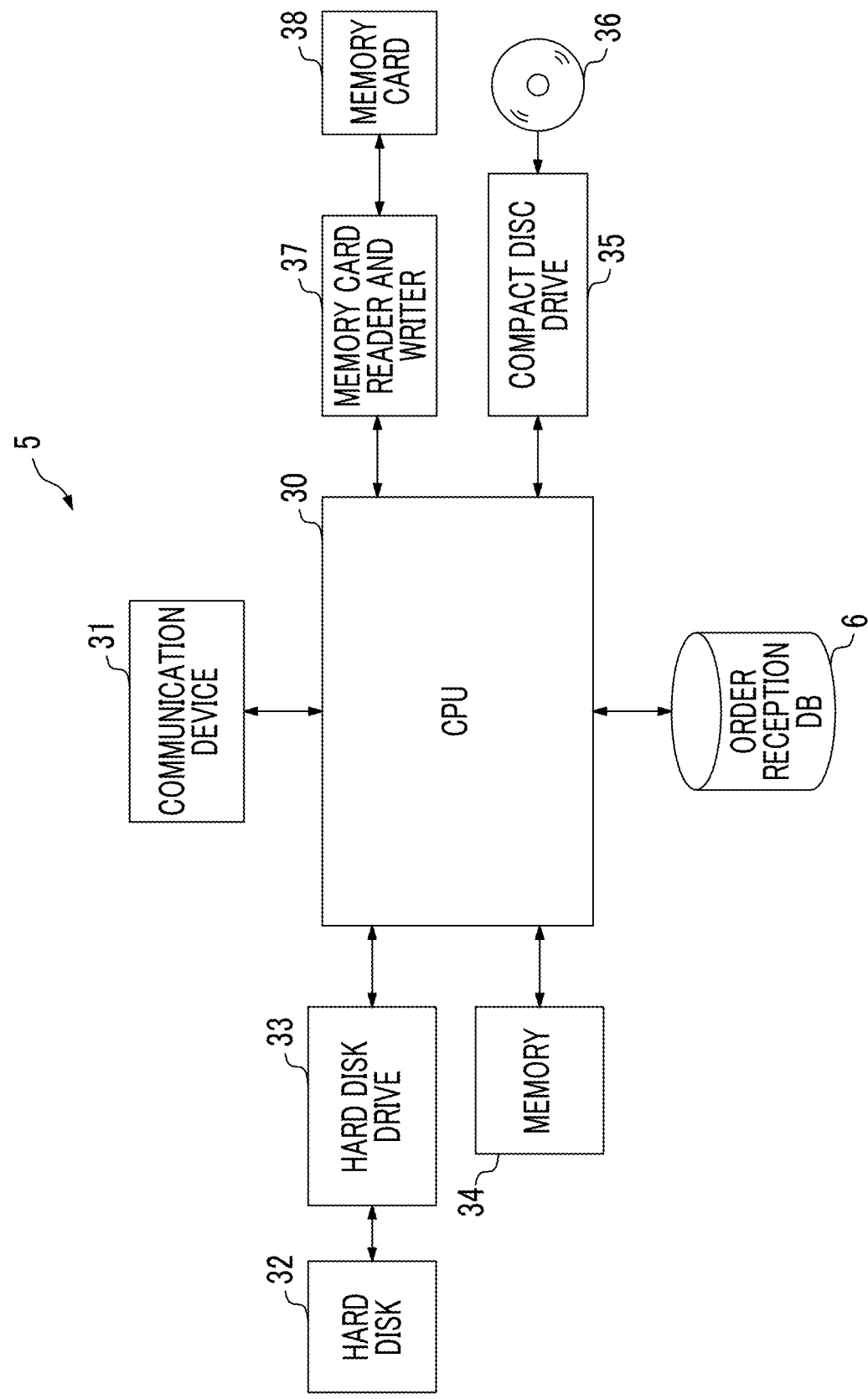
FIG. 3 is a block diagram illustrating an electric configuration of an order reception server.

FIG. 3 is a block diagram illustrating an electric configuration of the order reception server 5 to which the order reception database 6 is connected.

An operation of the entire order reception server 5 is managed by a central processing unit (CPU) 30.

The order reception server 5 includes a communication device 31 that communicates with apparatuses and the like other than the order reception server 5 by connecting to the Internet and other networks. In addition, the order reception server 5 includes a hard disk 32, a hard disk drive 33 that accesses the hard disk 32, and a memory 34 that stores data and the like. Furthermore, the order reception server 5 includes a compact disc drive 35 that accesses a compact disc 36, and a memory card reader and writer 37 that writes data into a memory card 38 and reads out data recorded on the memory card 38.

An operation program of the order reception server 5 described later is received in the communication device 31 through the Internet. The received operation program is installed on the order reception server 5. The operation program may be recorded on a portable recording medium such as the compact disc 36 and read out from the portable recording medium instead of being received by the order reception server 5 through a network such as the Internet and installed on the order reception server 5. In this case, the operation program read out from the portable recording medium is installed on the order reception server 5. Obviously, a computer (CPU 30) of the order reception server 5 can read out the operation program.

Figure 4:
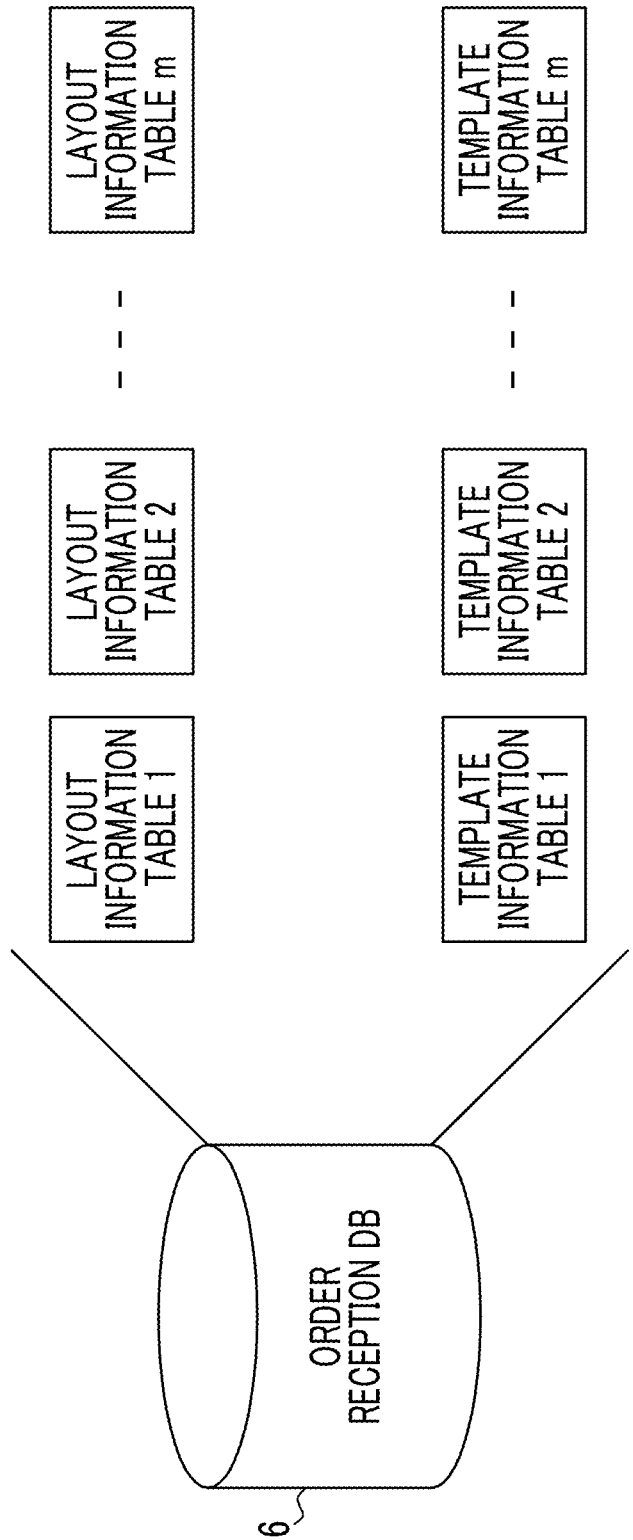
FIG. 4 illustrates a layout information table and a template information table stored in an order reception database.

FIG. 4 illustrates contents stored in the order reception database 6.

The order reception database 6 stores m (m is a natural number) number of layout information tables and m number of template information tables. The layout information table stores layout information for an album generated in the past. The template information table stores template information used in the album generated in the past.

Table 1 is one example of one layout information table of the m number of layout information tables.

TABLE 1

| Image ID | Feature Amount | Selection | Page | Position | Size |
|---|---|---|---|---|---|
| 1 | — | Y | 1 | 0, 0 | 60 × 40 |
| 2 | — | N | — | — | — |
| 3 | — | Y | 1 | 100, 100 | 20 × 30 |
| 4 | — | N | — | — | — |
| ⋮ | ⋮ | ⋮ | ⋮ | ⋮ | ⋮ |
| 100 | — | N | — | — | — |

The layout information table stores a feature amount of each of a plurality of images (referred to as a reference image group) in correspondence with an image ID. The feature amount may be resolution of the image, a data amount, a degree of blurriness, a type of main subject, a relative size of the main subject with respect to the image, a position of the main subject, a tint, and the like. The feature amount may also be generated by combining a plurality of above feature amounts. Furthermore, the feature amount may also be configured with a plurality of parameters output by a learned model by receiving an input of the image. The learned model is learned in advance by supervised learning or unsupervised learning. The feature amount output from the learned model may not be interpreted by a human being. However, at least a numerical value group that is uniquely output in a case where one image is input can be used as the feature amount according to an embodiment of the present invention. The feature amount is information necessary for deciding appropriateness as an image (image extracted from the plurality of images) to be used in the album, an arrangement position of the album, and the like. The layout information table also stores selection information about a certain user as to whether an image is used or not used in the album among the plurality of images, a page of the used image in the album, and information about each of a position and a size of the image. In the selection information, assignment of "Y" indicates an image used in the album, and assignment of "N" indicates an image not used in the album. The position is indicated by coordinates in a case where the upper left of each page of the album is set as an origin (0, 0). The size is represented by (lateral length) mm×(longitudinal length) mm of the image.

For example, an image of an image ID 1 is selected as images to be used in the album by a user of each of the client computers 1 to n based on the selection information "Y", is extracted by the CPU 10 (a part image extraction device) or the like, is used in page 1 of the album based on page information "1", is positioned based on positional information (0, 0) such that an upper left position of the image matches an upper left position of the page, and has a lateral length of 60 mm and a longitudinal length of 40 mm based on a size of 60×40. Similarly, it is perceived that an image of an image ID 2 is not used in the album based on the selection information "N". As described above, the part image extraction device according to the embodiment of the present invention can potentially extract a part of images from any reference image group. However, in extraction of an image from a first image group, it is not necessary to actually extract a part of images from all recorded reference image groups. The part image extraction device according to the embodiment of the present invention may simply extract a part of images from a second image group.

Table 2 is one example of one template information table of the m number of template information tables.

TABLE 2

| Page | Template ID |
|---|---|
| 1 | 3 |
| 2 | 7 |
| 3 | 5 |
| ⋮ | ⋮ |
| 16 | 20 |

The template information table of Table 2 corresponds to the layout information table of Table 1. In each layout information table, a layout information table ID for identifying the layout information table is assigned. Also in each template information table, a template information table ID for identifying the template information table is assigned. The template information table corresponding to the layout information table is managed using the layout information table ID and the template information table ID.

The layout information table and the template information table are information about an album of the reference image group. A plurality of layout information tables and template information tables are stored in the order reception database 6. Thus, information about an album of a plurality of reference image groups is stored in the order reception database 6. The order reception database 6 may store not only the information about the album of the plurality of reference image groups but also the plurality of reference image groups (image data) in addition to the information about the album of the plurality of reference image groups. In a case where the plurality of reference image groups are stored, the feature amount of the image is perceived by interpreting the plurality of reference image groups. Thus, the layout information table and the template information table may not be stored in the order reception database 6.

As will be described later, each time an order of the album is placed, the layout information table and the template information table are generated in the order reception server 5 by transmitting the layout information and the template information to the order reception server 5 from the client computer and receiving the layout information and the template information (information about the album of the reference image group) in the communication device 31 (reference image group input device) of the order reception server 5. The generated layout information table and template information table are stored in the order reception database 6 by the order reception server 5.

Figure 5:
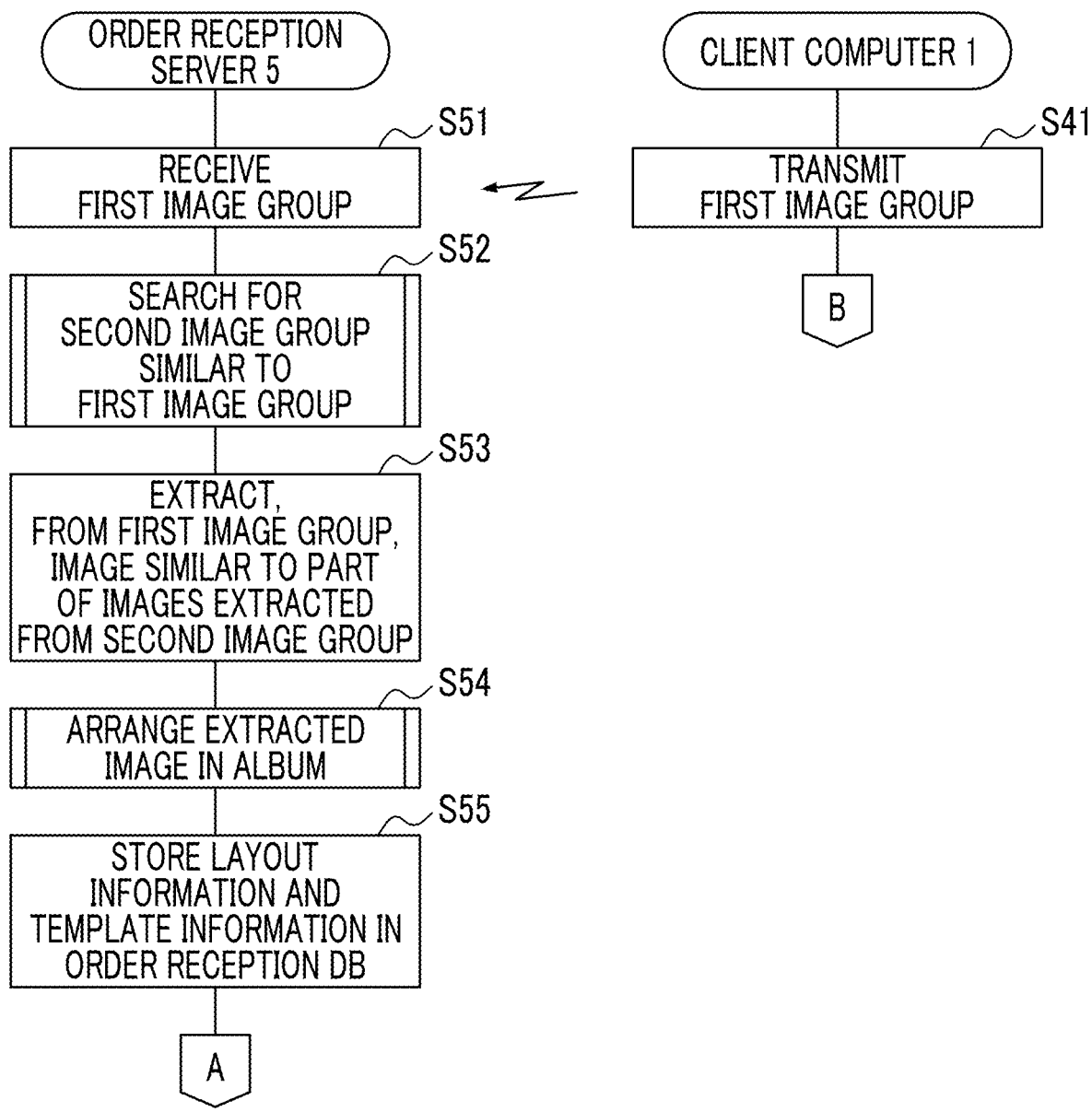
FIG. 5 is a flowchart illustrating a processing procedure of the image processing system.
Figure 6:
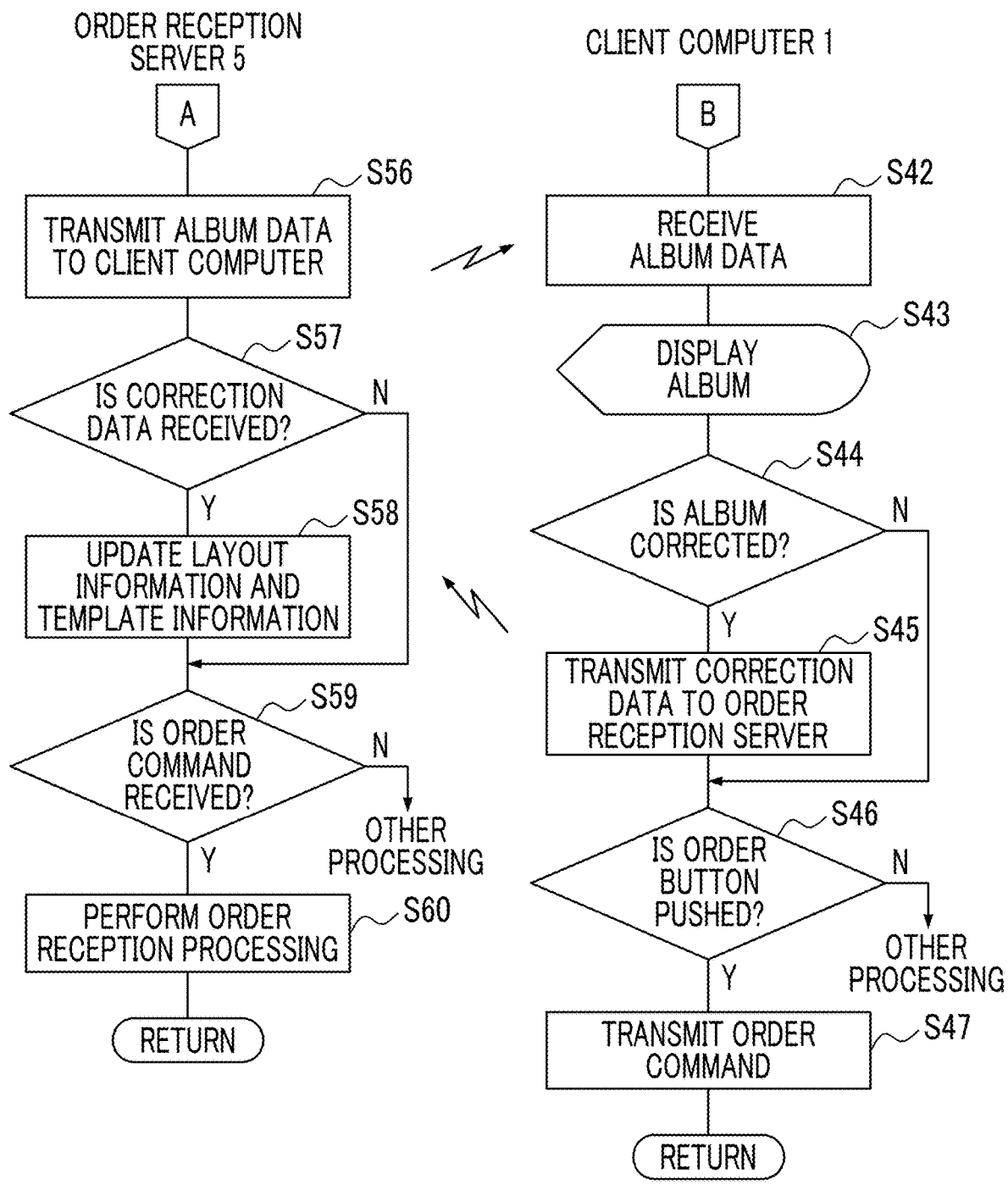
FIG. 6 is a flowchart illustrating a processing procedure of the image processing system.

FIG. 5 and FIG. 6 are flowcharts illustrating a processing procedure of the image processing system and illustrate processing procedures of the order reception server 5 and any client computer of the client computers 1 to n. In this example, communication is performed between the client computer 1 and the order reception server 5 (in the first example, the order reception server 5 is one example of an image processing apparatus).

The memory 15 of the client computer 1 stores image data representing a plurality of images (first image group) to be used in the album. For example, in a case where data representing the first image group is stored in the memory card 21, the data representing the first image group is input into the client computer 1 from the memory card 21 by the memory card reader and writer 20. In a case where the client computer 1 is a smartphone or the like, image data representing a plurality of images obtained by accumulation each time capturing is performed by a camera of the smartphone is the data representing the first image group.

The image data representing the first image group is transmitted to the order reception server 5 from the client computer 1 (step S41 in FIG. 5). Instead of the image data representing the first image group, data representing the feature amount of the image included in the first image group may be transmitted to the order reception server 5 from the client computer 1. The data representing the feature amount may be detected in the client computer 1 or may be detected in other apparatuses other than the client computer 1.

In a case where the data representing the first image group (or data representing a feature of the first image group) transmitted from the client computer 1 is received in the communication device 31 (a first image group reception device) of the order reception server 5 (step S51 in FIG. 5), information about an album of the second image group similar to the first image group is searched by the CPU 30 (an image group search device) of the order reception server 5 from the information about the album of the plurality of reference image groups consisting of the layout information table and the template information table stored in the order reception database 6 (step S52 in FIG. 5). In a case where the plurality of reference image groups are stored in the order reception database 6, the second image group may be searched instead of information about the second image group. In a case where the second image group is searched, the selection information for identifying an image used in the album among a plurality of images included in the second image group is also read out.

Here, "similar image groups" mean that images included in two image groups are similar to each other. In addition, "searching for the second image group similar to the first image group" means that an "image group including a plurality of images similar to the plurality of images included in the first image group is found as the second image group from a plurality of image groups".

The information about the album of the second image group similar to the first image group is searched as follows.

Figure 7:
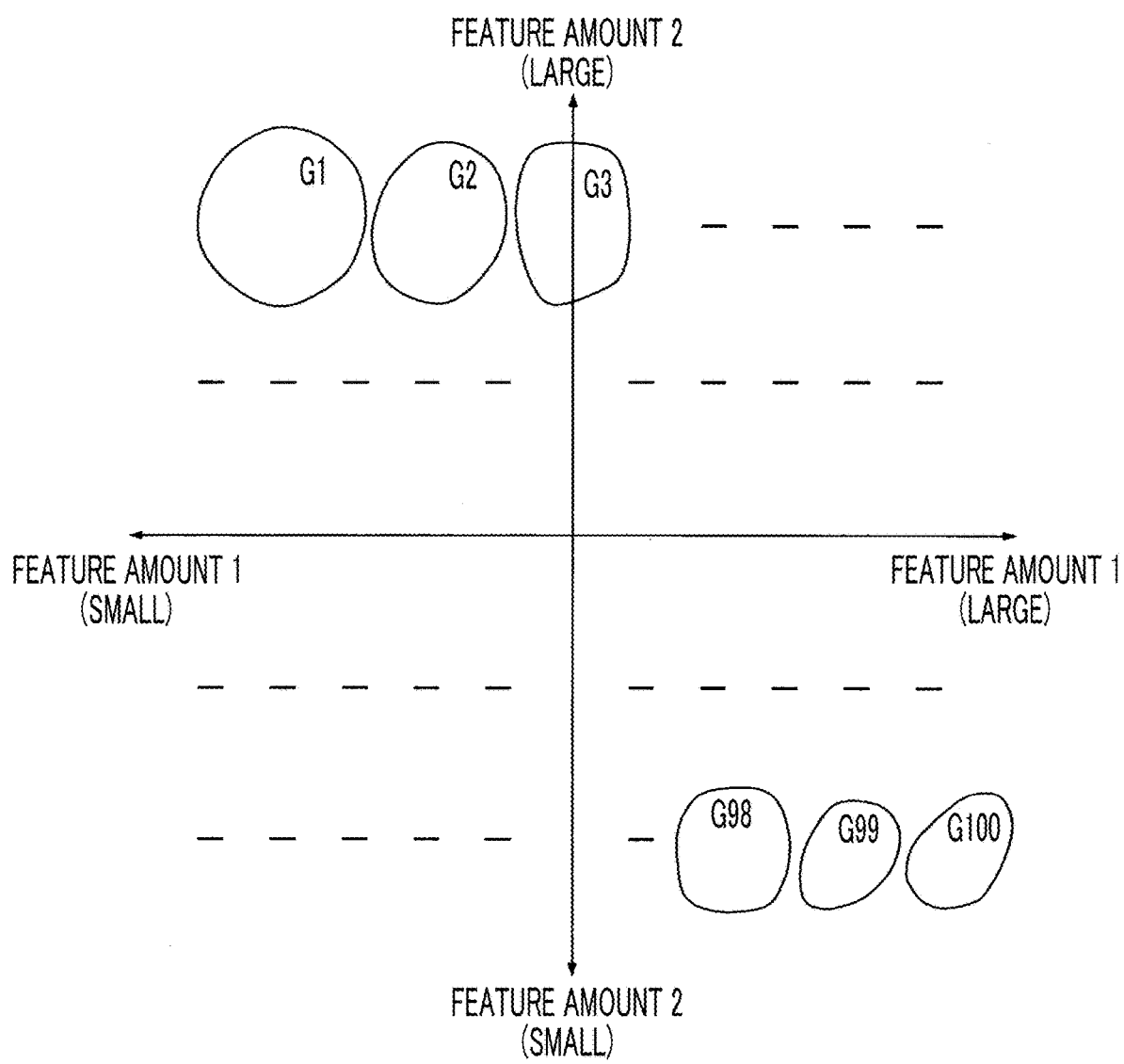
FIG. 7 is one example of image groups classified in a feature amount space.

FIG. 7 illustrates a state where the plurality of images included in the first image group are classified into a plurality of groups by first stage classification.

In FIG. 7, a horizontal axis denotes a first feature amount, and a vertical axis denotes a second feature amount. While a state where the plurality of images are classified into a plurality of groups by two feature amounts is illustrated, the number of feature amounts may not be two, and three or more feature amounts may be used. In FIG. 7, the plurality of images of a classification target are divided into 100 groups of a group G1 to a group G100 by the CPU 30. For example, this group division can be implemented using a k-means method. Images are included in each group of the group G1 to the group G100. Even in a case where actual images are not present, corresponding images (data for identifying images) may be divided into groups from feature amounts of the images.

Figure 8:
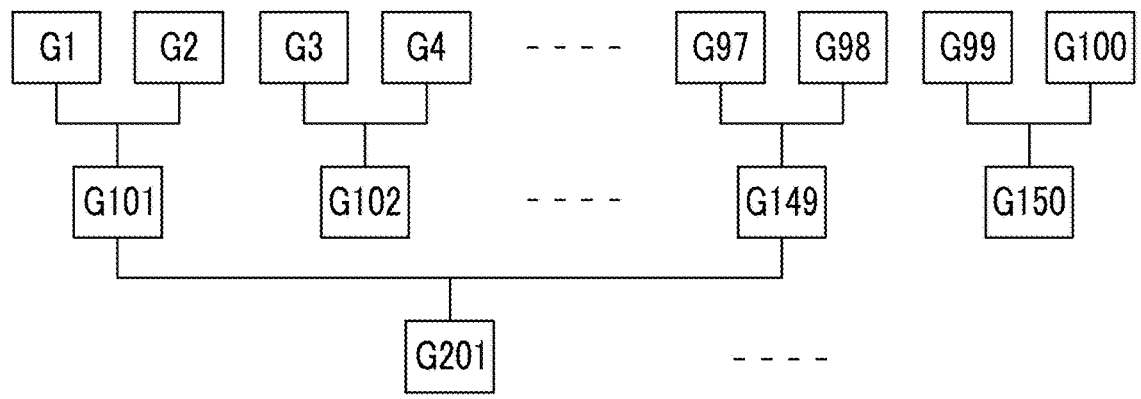
FIG. 8 illustrates a state where image groups are combined.

FIG. 8 illustrates a state of classification into a plurality of groups of the group G1 to the group G100.

Next, the CPU 30 determines whether or not similarity between groups is less than a threshold value, and groups for which similarity is less than the threshold value are combined with each other. For example, a centroid in a feature amount space illustrated in FIG. 7 may be obtained for each group of the group G1 to the group G100, and similarity between centroids may be used as similarity between groups.

For example, in a case where similarity between the group G1 and the group G2 (similarity between a centroid of the group G1 and a centroid of the group G2) is less than the threshold value, a new group G101 is generated by combining the group G1 with the group G2. In a case where the group G1 and the group G2 are regarded as small groups, this case corresponds to combining small groups in a case where similarity between the small groups is greater than or equal to a threshold value (second threshold value). Similarly, in a case where similarity between the group G3 and the group G4 is less than the threshold value, a new group G102 is generated by combining the group G3 with the group G4. Similarly, a new group G149 is generated by combining the group G97 with the group G98, and a new group G150 is generated by combining the group G99 with the group G100. Newly generated groups are also combined in a case where similarity between the groups is less than the threshold value. For example, a new group G201 is generated by combining the group G101 with the group G149.

Figure 9:
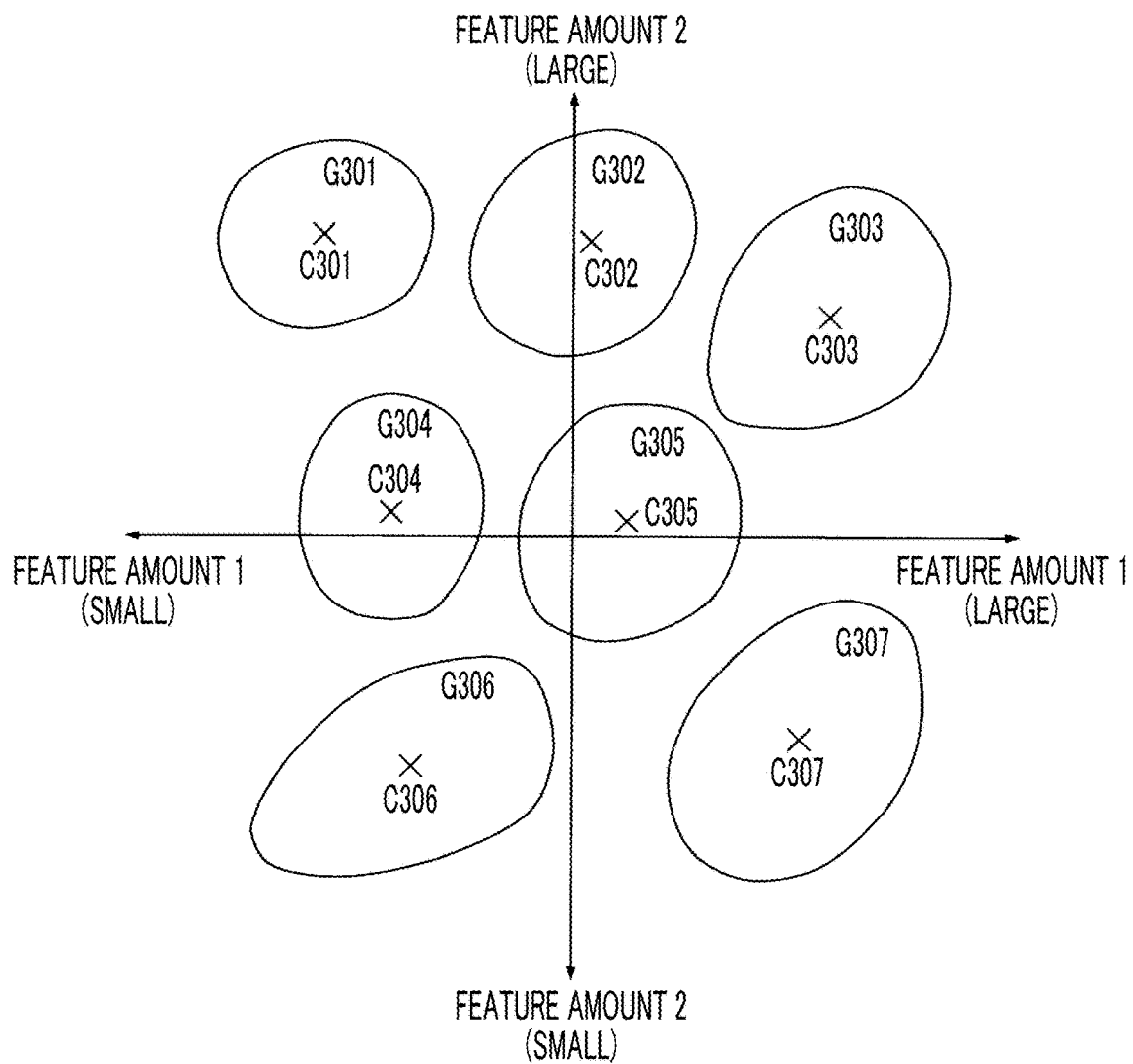
FIG. 9 is one example of image groups classified in the feature amount space.

In a case where groups for which similarity therebetween is less than the threshold value are not present anymore, the images included in the first image group are divided into a collection of small groups (second small group collection) of similar images as illustrated in FIG. 9.

FIG. 9 illustrates a feature amount space defined by the first feature amount on a horizontal axis and the second feature amount on a vertical axis in the same manner as FIG. 7.

In this feature amount space, the images included in the first image group are divided into seven small groups of a group G301 to a group G307. The CPU 30 calculates a centroid C301 to a centroid C307 in the groups of the group G301 to the group G307, respectively.

Figure 10:
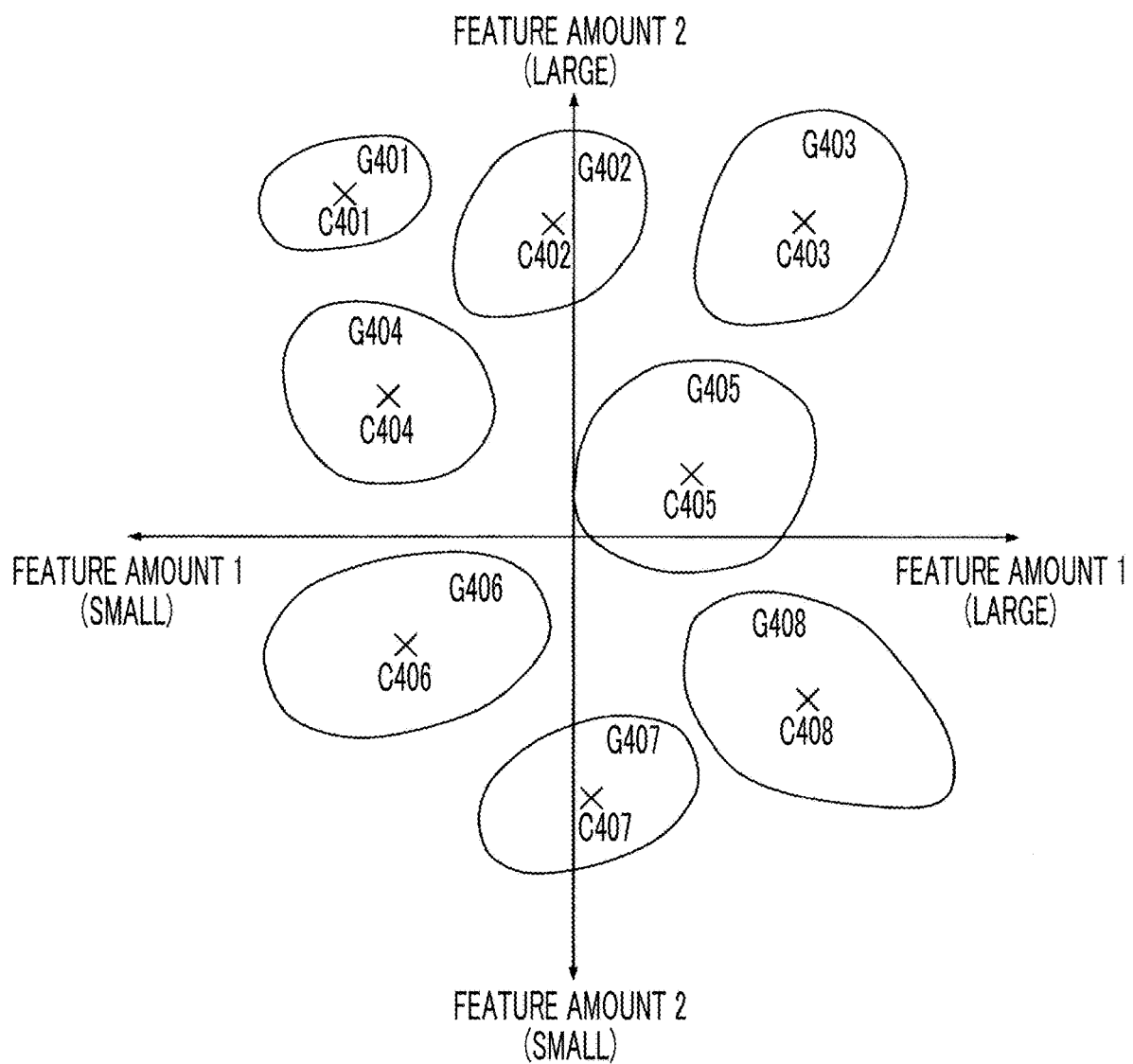
FIG. 10 is one example of image groups classified in the feature amount space.

Similarly, processing described with reference to FIG. 7 and FIG. 8 is performed on feature amounts of the plurality of reference image groups stored in the order reception database 6, and as illustrated in FIG. 10, each reference image group is divided into a collection of small groups (first small group collection) of images for which feature amounts of images included in the reference image group are similar.

FIG. 10 illustrates a feature amount space defined by the first feature amount on a horizontal axis and the second feature amount on a vertical axis in the same manner as FIG. 9.

In this feature amount space, the feature amounts of the images included in the reference image group are divided into eight small groups of groups G401 to G408. A centroid C401 to a centroid C408 is also calculated in the group G401 to the group G408.

A distribution of the feature amounts of the images illustrated in FIG. 10 is generated for each reference image group of the plurality of reference image groups stored in the order reception database 6.

A sum of distances (degree of matching between the first small group and the second small group) in the feature amount space between, respectively, the centroid C301 to the centroid C307 of the group G301 to the group G307 generated for the first image group as illustrated in FIG. 9 and the centroid C401 to the centroid C408 of the group G401 to the group G408 generated for the reference image group as illustrated in FIG. 10 is calculated for all reference image groups of the plurality of reference image groups. A reference image group for which the sum of distances is less than or equal to a threshold value (corresponds to a case where the degree of matching between the first small group and the second small group is greater than or equal to a threshold value) is searched by the CPU 30 (an image group search device) as the second image group similar to the first image group.

In a case where the second image group is searched from the plurality of reference image groups, a part of images extracted from the searched second image group is found by the CPU 30, and an image similar to the extracted part of the images is extracted from the images included in the first image group by the CPU 30 (a similar image extraction device) (step S53 in FIG. 5). The image extracted from the second image group is perceived by referring to the selection information stored in the layout information table corresponding to the second image group in a set of the layout information table and the template information table stored in the order reception database 6. As described above, the image for which the selection information is "Y" is the extracted image.

Figure 11:
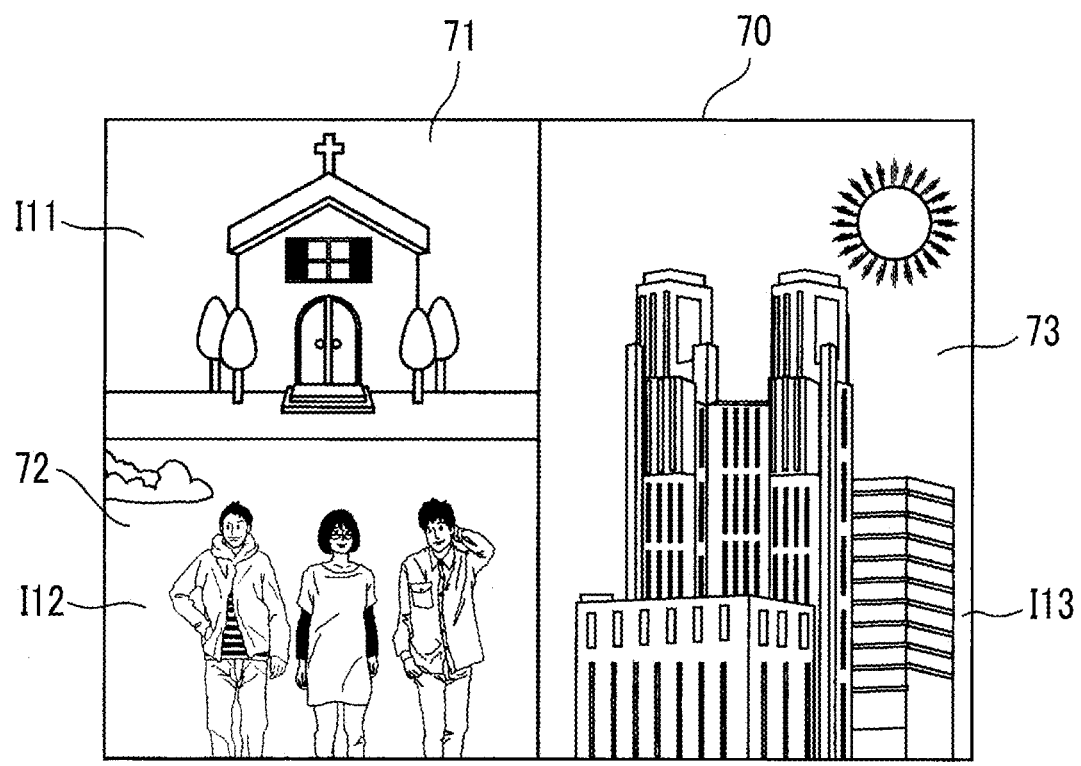
FIG. 11 illustrates a part of an album generated from images included in a second image group.

FIG. 11 illustrates a part of pages of the album generated using the image extracted from the second image group.

A template 70 is used in the part of the pages of the album. In the template 70, regions 71, 72, and 73 in which images are pasted are defined at the upper left, the lower left, and the right. Images I11, I12, and I13 are pasted in the regions 71, 72, and 73. Information (information such as which image is pasted in which region) about the page 70 is perceived from the layout information table and the template information table corresponding to the second image group.

The image extracted from the first image group is arranged in the album by the CPU 30 (step S54 in FIG. 5). The image is arranged in the album based on album information included in the template information table and the layout information table corresponding to the second image group similar to the first image group.

Figure 12:
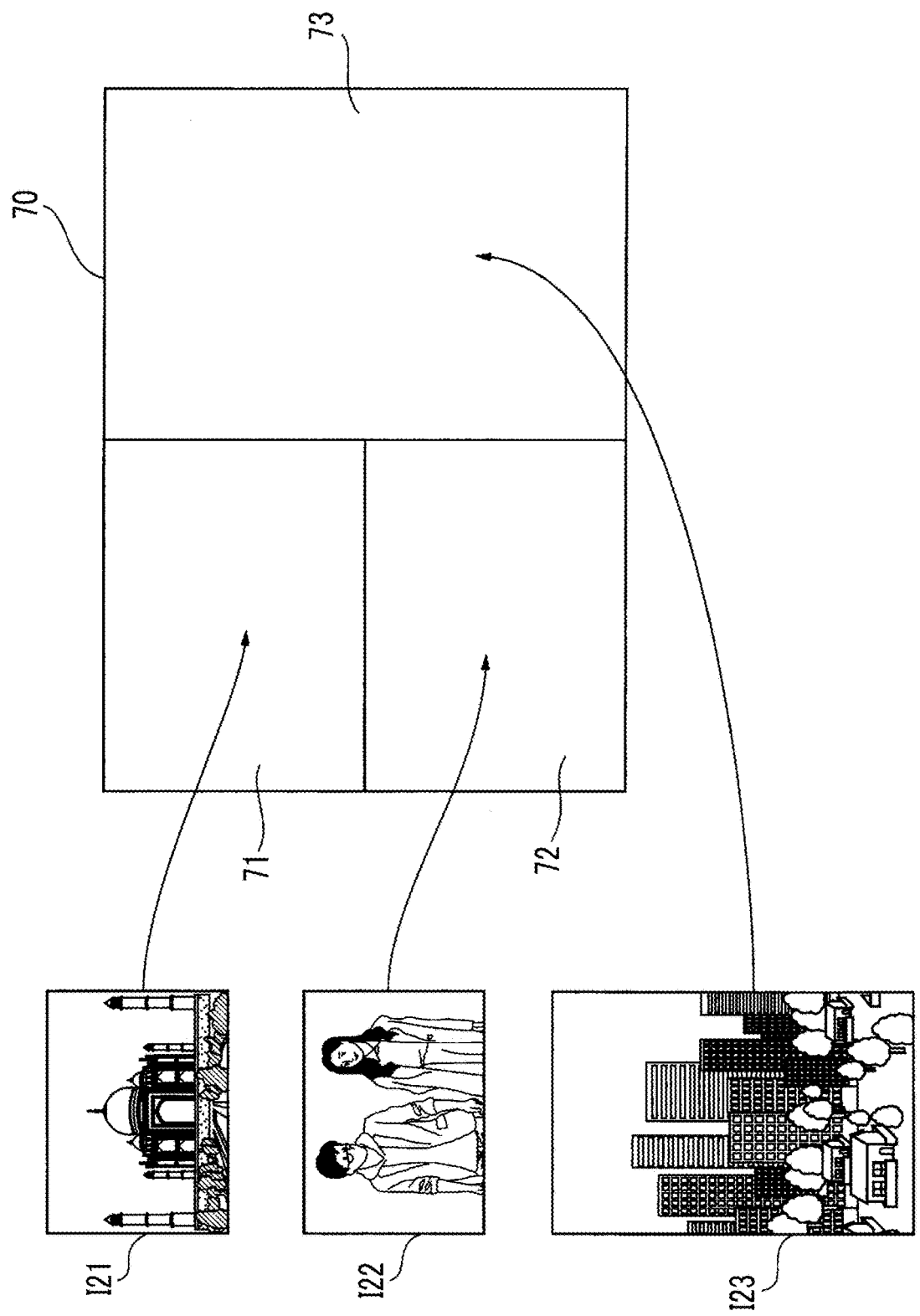
FIG. 12 illustrates a state where an image extracted from a first image group is arranged.

FIG. 12 illustrates a state where the image extracted from the first image group is arranged in the album.

Images I21, I22, and I23 are extracted from the first image group as images similar to the images I11, I12, and I13, respectively, extracted from the second image group. The same template as the template 70 in which the images I11, I12, and I13 extracted from the second image group are pasted is found.

The image I21 of the first image group similar to the image I11 of the second image group is arranged in the region 71 in which the image I11 is arranged. The image I22 of the first image group similar to the image I12 of the second image group is arranged in the region 72 in which the image I12 is arranged. Similarly, the image I23 of the first image group similar to the image I13 of the second image group is arranged in the region 73 in which the image I13 is arranged.

Figure 13:
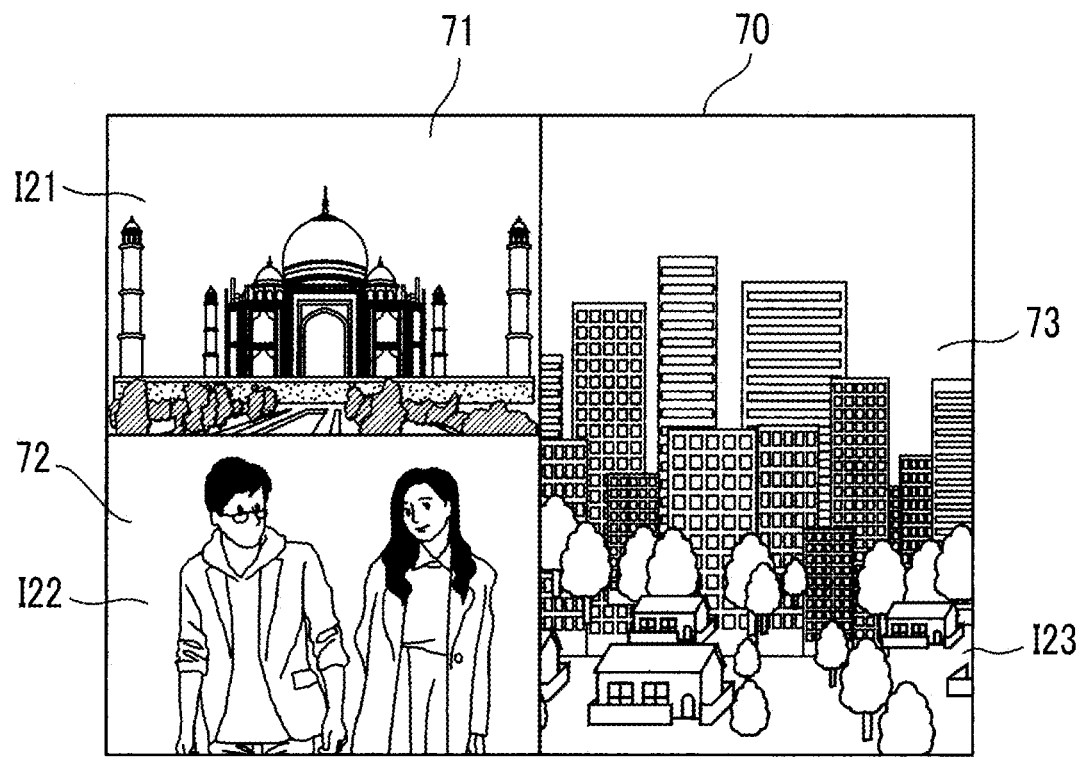
FIG. 13 illustrates a part of an album generated from the image extracted from the first image group.

FIG. 13 illustrates a part of pages of the album generated using the image extracted from the first image group.

The part of the pages of the album illustrated in FIG. 13 is generated as the same album by consulting the part of the pages of the album generated using the image extracted from the second image group illustrated in FIG. 11.

As is perceived by comparing FIG. 11 with FIG. 13, similar images constitute the albums in the same layout.

The template of the album is decided based on a template ID stored in the template information table corresponding to the second image group, and the image extracted from the first image group is arranged in the album in accordance with a page, a position, and a size in which the image extracted from the second image group is pasted. Accordingly, an album similar to the album generated using the second image group similar to the first image group can be automatically generated from the first image group.

In a case where the album is generated, processing such as correction of arrangement locations of the images arranged in the generated album or changing of the images is performed. Details of this processing will be described later.

In a case where the album is generated from the first image group, the layout information table and the template information table for the first image group are generated, and the generated layout information table and template information table are stored in the order reception database 6 by the CPU 30 of the order reception server 5 (step S55 in FIG. 5).

Next, album data that represents the album is transmitted to the client computer 1 from the order reception server 5 (step S56 in FIG. 6).

In a case where the album data is received in the client computer 1 (step S42 in FIG. 6), the album generated in the order reception server 5 is displayed on the display screen of the display device 11 of the client computer 1 (step S43 in FIG. 6).

The user of the client computer 1 checks the displayed album and corrects the album in a case where the user thinks that the album needs to be corrected. For example, replacement of the image arranged in the album, changing of the arrangement position of the image, changing of the size of the image, or changing of the template is performed as necessary. In a case where the album is corrected (YES in step S44 in FIG. 6), correction data that represents a corrected content is transmitted to the order reception server 5 from the client computer 1 (step S45 in FIG. 6). Instead of transmitting the correction data, the album data after correction may be transmitted to the order reception server 5.

In a case where the correction data transmitted from the client computer 1 is received in the order reception server 5 (YES in step S57 in FIG. 6), contents of the layout information table and the template information table of the second image group are updated based on the received correction data (step S58 in FIG. 6).

In a case where the user of the client computer 1 pushes an order button (YES in step S46 in FIG. 6), an order command is transmitted to the order reception server 5 from the client computer 1 (step S47 in FIG. 6).

In a case where the order command transmitted from the client computer 1 is received in the order reception server 5 (YES in step S59 in FIG. 6), order reception processing is performed. The album is generated using the layout information table and the template information table corresponding to the second image group among the layout information tables and the template information tables stored in the order reception database 6. In a case where the album data is stored in the order reception server 5, the album may be generated using the album data.

Figure 14:
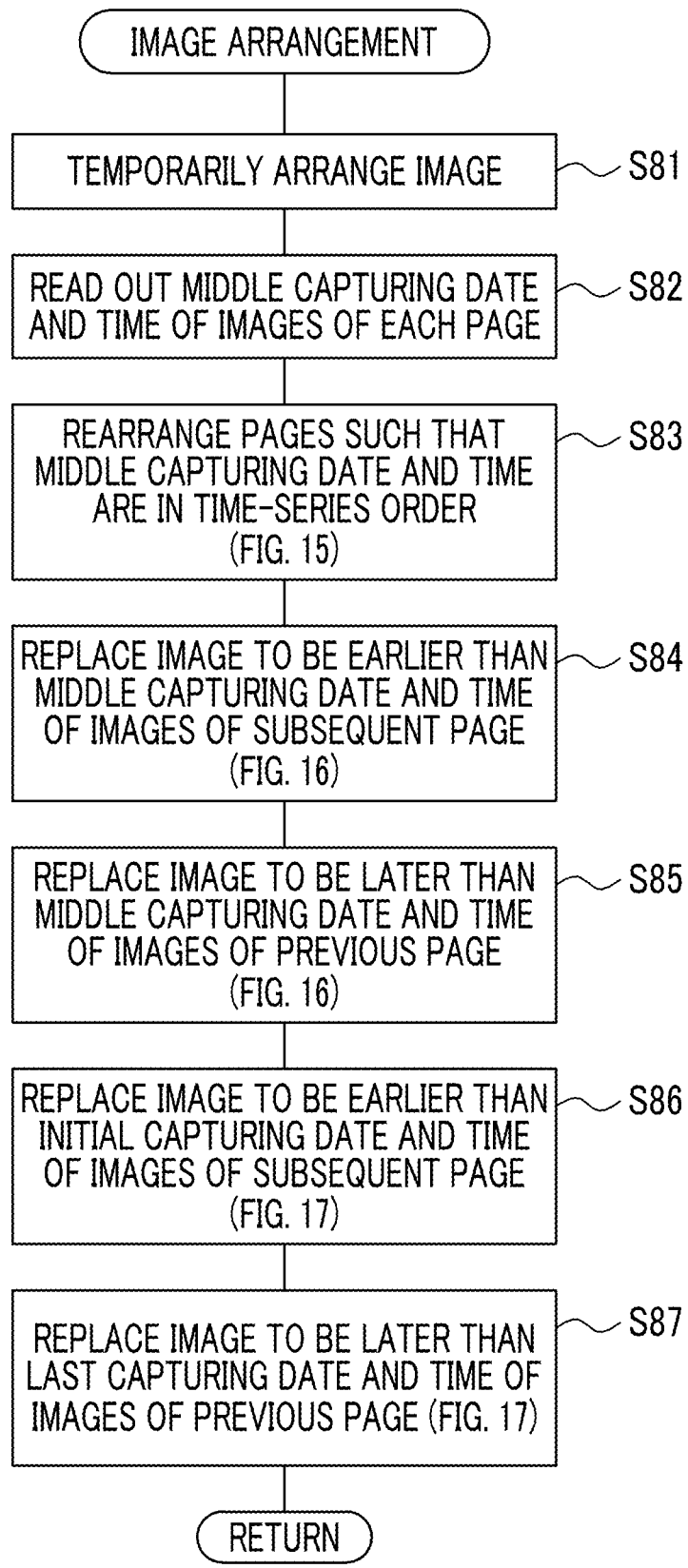
FIG. 14 is a flowchart illustrating an image arrangement processing procedure.

FIG. 14 is a flowchart illustrating an image arrangement processing procedure (processing procedure of step S54 in FIG. 5). The processing procedure illustrated in FIG. 14 sets capturing dates and times of the images arranged in the generated album in a time-series order.

As described with reference to FIG. 11 to FIG. 13, the images included in the first image group are arranged (temporarily arranged) similarly to the album of the second image group searched from the plurality of reference image groups (step S81).

Figure 15:
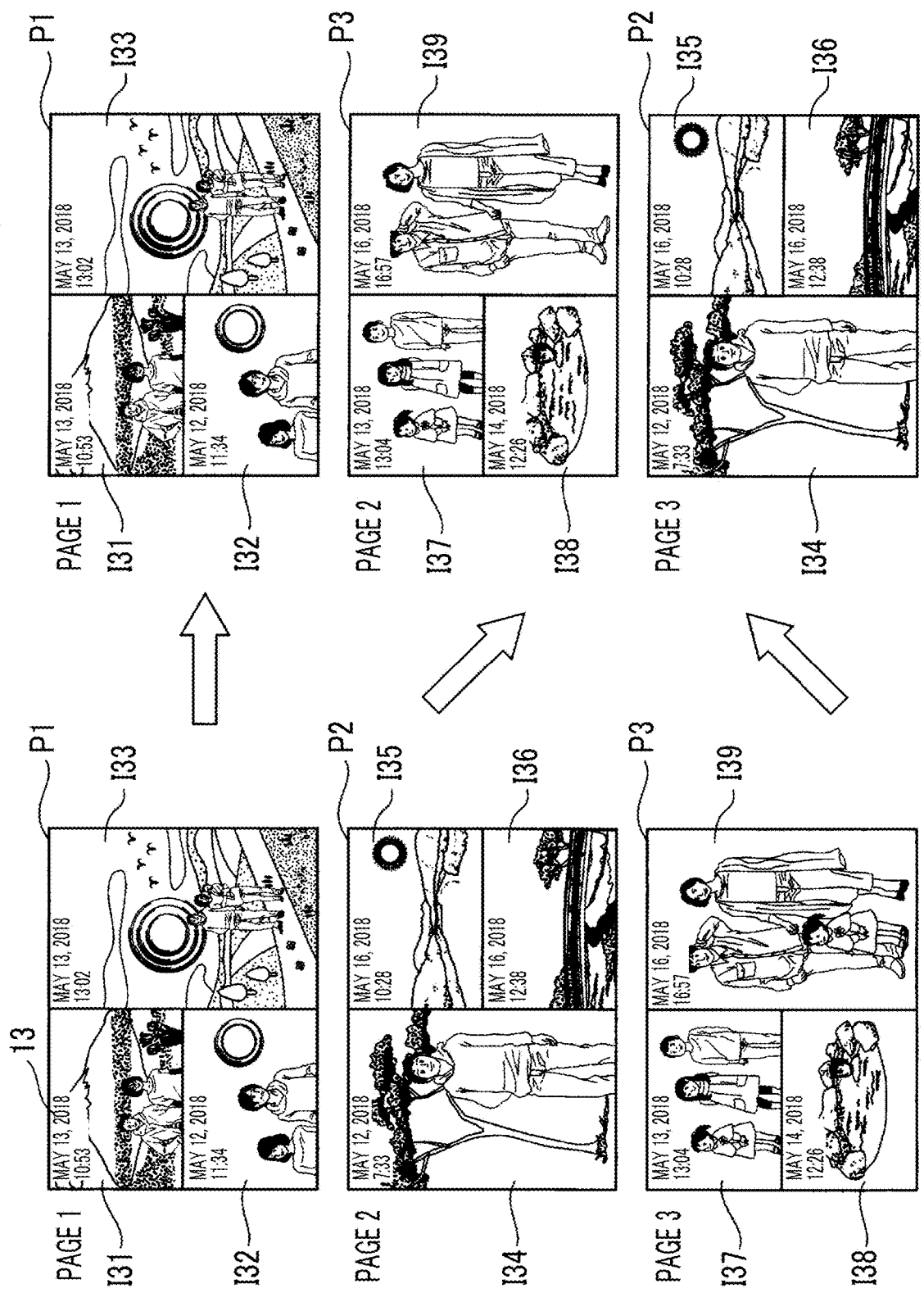
FIG. 15 illustrates a state where arrangement of images is changed.

FIG. 15 illustrates a part of the album generated from the images included in the first image group.

A page image P1 of page 1, a page image P2 of page 2, and a page image P3 of page 3 constituting a part of the album are represented on a left side of FIG. 15. An image I31, an image I32, and an image I33 are arranged at the upper left, the lower left and the right of the page image P1, respectively. The image I31 is captured at 10:53 on May 13, 2018. The image I32 is captured at 11:34 on May 12, 2018. The image I33 is captured at 13:02 on May 13, 2018. An image I34, an image I35, and an image I36 are arranged at the left, the upper right, and the lower right of the page image P2, respectively. The image I34 is captured at 7:33 on May 12, 2018. The image I35 is captured at 10:28 on May 16, 2018. The image I36 is captured at 12:38 on May 16, 2018. An image I37, an image I38, and an image I39 are arranged at the upper left, the lower left, and the right of the page image P3, respectively. The image I37 is captured at 13:04 on May 13, 2018. The image I38 is captured at 12:26 on May 14, 2018. The image I39 is captured at 16:57 on May 16, 2018. In this stage, an order of arrangement of the images in the album may not necessarily match an order of capturing dates and times of the images. Thus, the following procedure is subsequently performed in a case where the user desires.

First, a middle capturing date and time (middle capturing date and time may be any of a middle value, an average value, a center value, or the like of capturing dates and times of images arranged in each page) among the capturing dates and times of the images arranged in each page are read out. Among the image I31, the image I32, and the image I33 included in the page image P1 of page 1, the image I31 is captured at 10:53 on May 13, 2018. The image I32 is captured at 11:34 on May 12, 2018. The image I33 is captured at 13:02 on May 13, 2018. Thus, the middle capturing date and time are 10:53 on May 13, 2018 of the image I31, and this capturing date and time are read out (obtained) by the CPU 30 (step S82). Similarly, among the image I34, the image I35, and the image I36 included in the page image P2 of page 2, the image I34 is captured at 7:33 on May 12, 2018. The image I35 is captured at 10:28 on May 16, 2018. The image I36 is captured at 12:38 on May 16, 2018. Thus, the middle capturing date and time are 10:28 on May 16, 2018 of the image I35, and this capturing date and time are read out by the CPU 30. Furthermore, among the image I37, the image I38, and the image I39 included in the page image P3 of page 3, the image I37 is captured at 13:04 on May 13, 2018. The image I38 is captured at 12:26 on May 14, 2018. The image I39 is captured at 16:57 on May 16, 2018. Thus, the middle capturing date and time are 12:26 on May 14, 2018 of the image I38, and this capturing date and time are read out by the CPU 30.

As illustrated on a right side of FIG. 15, the page images P1, P2, and P3 are rearranged by the CPU 30 (a rearrangement device) such that the middle capturing date and time read out are in a time-series order (step S83). Page 1 is not rearranged. Page 2 is rearranged from the page image P2 to P3. Page 3 is rearranged from the page image P3 to P2. Since a time-series order is set in a case of a view in units of pages, images can be arranged in a natural order as an album. However, in this stage, there is a possibility that a capturing date and time of a certain photograph of a certain page are later than the middle capturing date and time of a photograph group of the subsequent page. Therefore, the following procedure is subsequently performed in a case where the user desires.

Next, images arranged on one page are replaced with other images by the CPU 30 (a first image replacement device) such that capturing dates and times of the images arranged on one page of the album are earlier than the middle capturing date and time of capturing dates and times of images arranged on the subsequent page (step S84).

As represented on the right side of FIG. 15, the image I31 included in the page image P1 set as page 1 is captured at 10:53 on May 13, 2018. The image I32 is captured at 11:34 on May 12, 2018. The image I33 is captured at 13:02 on May 13, 2018. All of the images I31, I32, and I33 are earlier than 12:26 on May 14, 2018 which is the middle capturing date and time of capturing dates and times of images included in the page image P3 of page 2 which is the subsequent page. Thus, the images I31, I32, and I33 included in the page image P1 of page 1 are not replaced.

The image I37 included in the page image P3 set as page 2 is captured at 13:04 on May 13, 2018. The image I38 is captured at 12:26 on May 14, 2018. The image I39 is captured at 16:57 on May 16, 2018. The image I39 having a capturing date and time later than 10:28 on May 16, 2018 which is the middle capturing date and time of capturing dates and times of images included in the page image P2 of page 3 which is the subsequent page is included. Therefore, the image I39 is replaced with an image that is similar to the image I39 and has a capturing date and time earlier than 10:28 on May 16, 2018 which is the middle capturing date and time of the capturing dates and times of the images included in the page image P2 of the subsequent page.

Furthermore, images arranged on one page are replaced with other images by the CPU 30 (a second image replacement device) such that capturing dates and times of the images arranged on one page of the album are later than the middle capturing date and time of capturing dates and times of images arranged on the previous page (step S85).

With reference to the page images P1, P2, and P3 represented on the right side of FIG. 15, the image I37 included in the page image P3 (one page) set as page 2 is captured at 13:04 on May 13, 2018. The image I38 is captured at 12:26 on May 14, 2018. The image I39 is captured at 16:57 on May 16, 2018. The images I37, I38, and I39 are later than 13:02 on May 13, 2018 which is the middle capturing date and time of the images I31, I32, and I33 included in the page image P1 of page 1 which is the previous page. Thus, the images of the page image P3 set as page 2 are not replaced.

The image I34 included in the page image P2 (one page) set as page 3 is captured at 7:33 on May 12, 2018. The image I35 is captured at 10:28 on May 16, 2018. The image I36 is captured at 12:38 on May 16, 2018. The image I34 having a capturing date and time earlier than 12:36 on May 14, 2018 which is the middle capturing date and time of the images I37, I38, and I39 included in the page image P3 of page 2 which is the previous page is included. Therefore, the image I34 is replaced with an image that is similar to the image I34 and has a capturing date and time later than 12:36 on May 14, 2018 which is the middle capturing date and time of the capturing dates and times of the images included in the page image P3 of the previous page.

Figure 16:
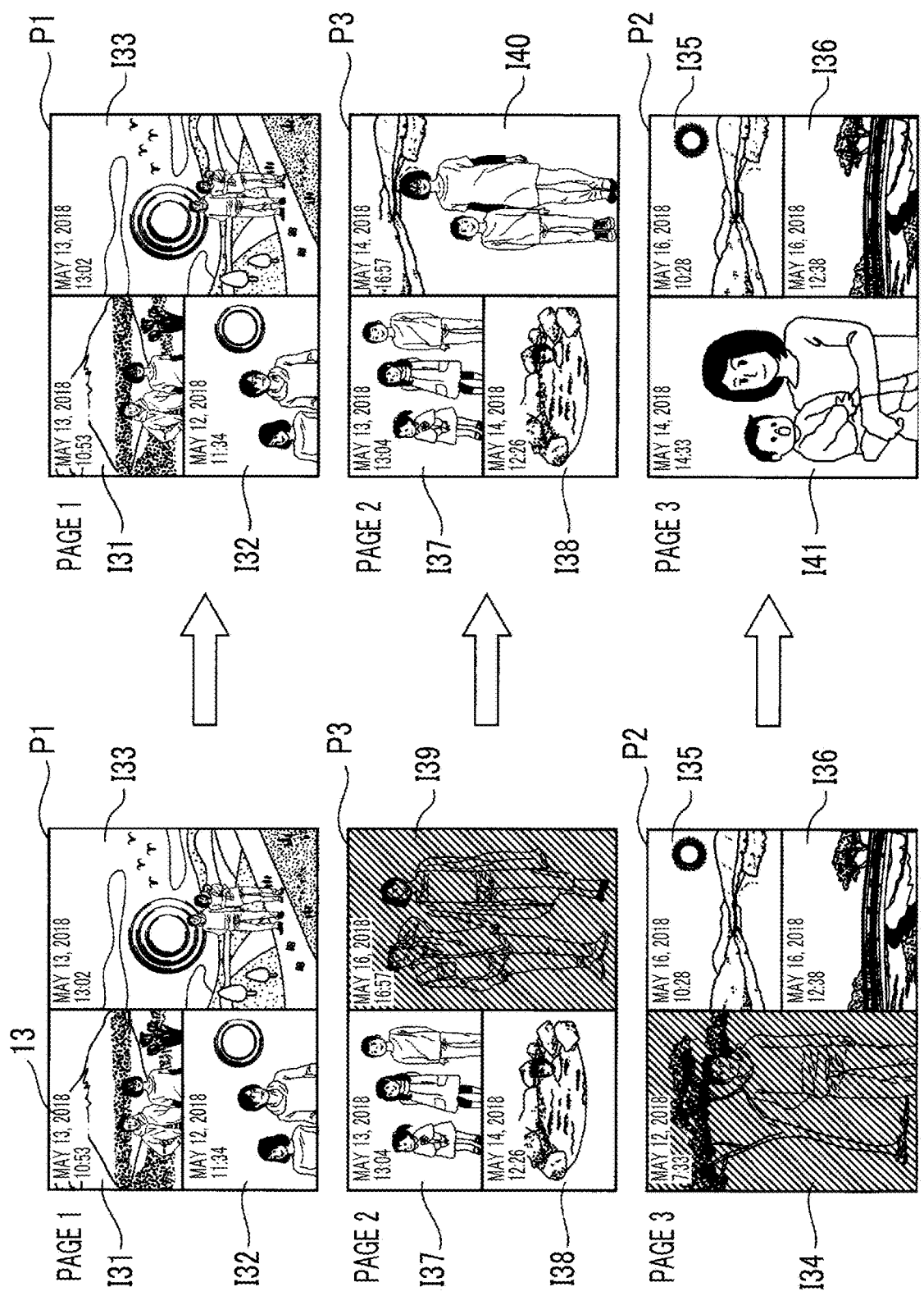
FIG. 16 illustrates a state where arrangement of images is changed.

The page image P1 of page 1, the page image P3 of page 2, and the page image P2 of page 3 are represented on a left side of FIG. 16. The images I31 to I39 included in the page images P1, P3, and P2 represented on the left side of FIG. 16 and arrangement of the images I31 to I39 are the same as the images I31 to I39 included in the page images P1, P3, and P2 represented on the right side of FIG. 15 and arrangement of the images I31 to I39. However, the images I39 and I34 to be replaced are hatched in order for the user to easily perceive the images I39 and I34. Instead of hatching, the images I39 and I34 to be replaced may be set to be distinguishable from other images by making the images I39 and I34 darker or brighter than the other images. The images I39 and I34 to be replaced may not necessarily be set to be distinguishable from the other images.

As represented on a right side of FIG. 16, by executing step S84 and step S85, the image I39 included in the page image P3 of page 2 is replaced with an image I40 having a capturing date and time of 16:57 on May 14, 2018. The image I34 included in the page image P2 of page 3 is replaced with an image I41 having a capturing date and time of 14:33 on May 14, 2018. Accordingly, capturing dates and times of images arranged on one page of the album are set to be later than the middle capturing date and time of capturing dates and times of images arranged on the previous page. In addition, the capturing dates and times of the images arranged on one page of the album are set to be earlier than the middle capturing date and time of capturing dates and times of images arranged on the subsequent page. However, therefore, in this stage, there is a possibility that a certain image of a certain page is later than an initial capturing date and time of the images arranged on the subsequent page. Therefore, the following steps are subsequently executed in a case where the user desires.

Images arranged on one page are replaced with other images by the CPU 30 (a third image replacement device) such that capturing dates and times of the images arranged on one page of the album are earlier than the initial capturing date and time of images arranged on the subsequent page (step S86).

As represented on the right side of FIG. 16, the image I31 included in the page image P1 (one page) set as page 1 is captured at 10:53 on May 13, 2018. The image I32 is captured at 11:34 on May 12, 2018. The image I33 is captured at 13:02 on May 13, 2018. The images I31, I32, and I33 are captured earlier than 13:04 on May 13, 2018 which is the initial capturing date and time of the images I37, I38, and I39 arranged in the page image P3 of page 2 which is the subsequent page. Thus, the images I31, I32, and I33 included in the page image P1 are not replaced.

The image I37 included in the page image P3 (one page) set as page 2 is captured at 13:04 on May 13, 2018. The image I38 is captured at 12:26 on May 14, 2018. The image I40 is captured at 16:57 on May 14, 2018. The capturing date and time of the image I40 are later than 14:33 on May 14, 2018 which is the initial capturing date and time of the images I41, I35, and I36 arranged in the page image P2 which is the subsequent page. Thus, the image I40 included in the page image P3 is replaced with an image that is similar to the image I40 (or the image I39) and is captured at a capturing date and time later than 14:33 on May 14, 2018 which is the initial capturing date and time of the images I41, I35, and I36 arranged in the page image P2 which is the subsequent page.

Figure 17:
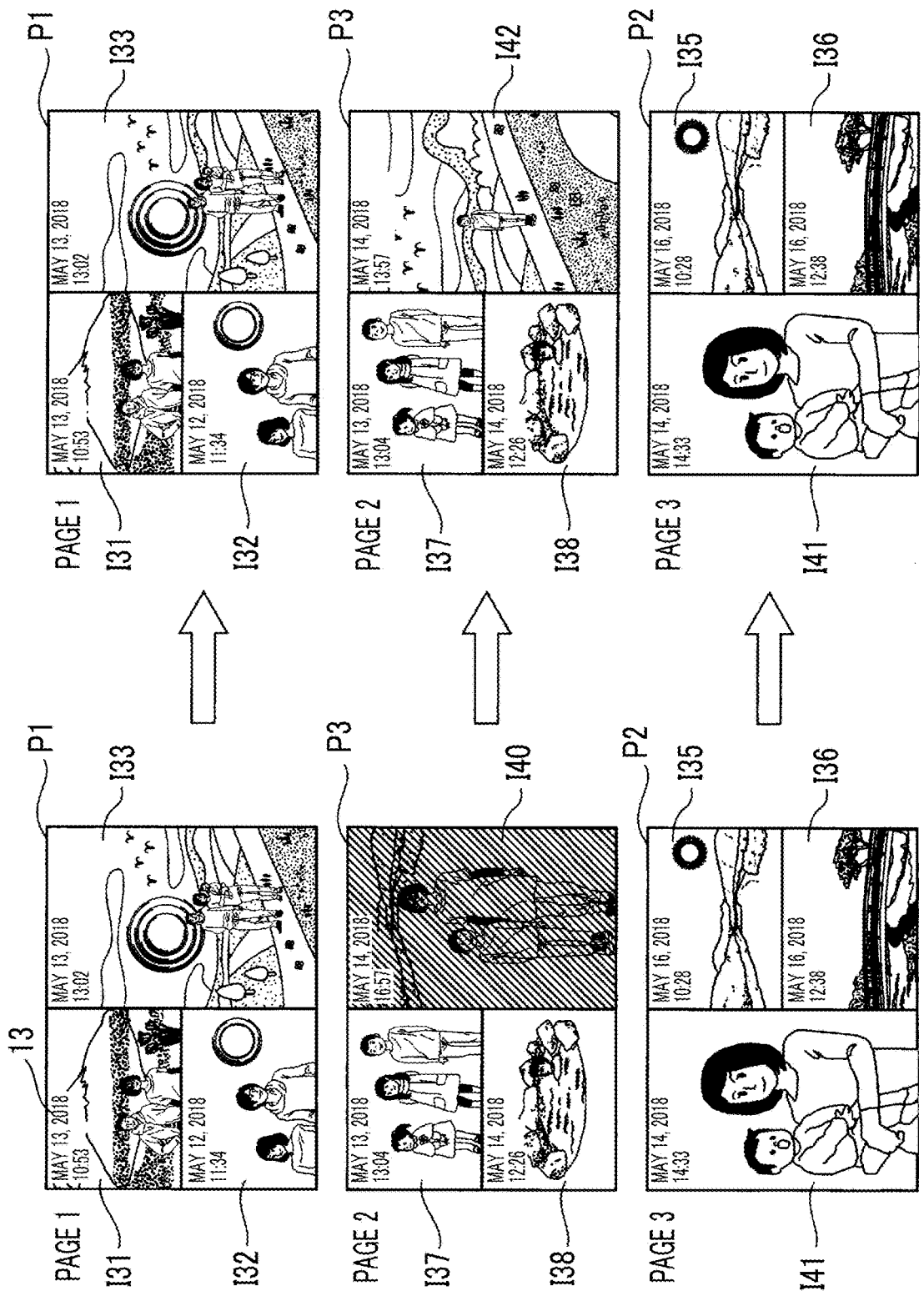
FIG. 17 illustrates a state where arrangement of images is changed.

Images I31 to I33, I35 to I37, I41, and I42 included in the page images P1, P3, and P2 on a left side of FIG. 17 are the same as the images I31 to I33, I35 to I38, I40, and I41 included in the page images P1, P3, and P2 displayed on the right side of FIG. 16, and arrangement thereof is also the same. However, the image I40 to be replaced is hatched in order for the user to easily perceive the image I40.

As represented on a right side of FIG. 17, the image I40 of the page image P3 is replaced with the image I42 that is similar to the image I40 and is captured at a capturing date and time later than 14:33 on May 14, 2018 which is the initial capturing date and time of the images I41, I35, and I36 arranged in the page image P2 which is the subsequent page. The image I42 has a capturing date and time of 13:57 on May 14, 2018 and is captured at a capturing date and time later than 14:33 on May 14, 2018 which is the initial capturing date and time of the images I41, I35, and I36 arranged in the page image P2.

Next, images arranged in one page are replaced with other images by the CPU 30 (a fourth image replacement device) such that capturing dates and times of the images arranged on one page of the album are later than a last capturing date and time of images arranged on the previous page (step S87).

As represented on the right side of FIG. 17, the image I37 included in the page image P3 (one page) set as page 2 is captured at 13:04 on May 13, 2018. The image I38 is captured at 12:26 on May 14, 2018. The image I42 is captured at 13:57 on May 14, 2018. The images I37, I38, and I42 are captured later than 13:02 on May 13, 2018 which is the last capturing date and time of the images I31, I32, and I33 arranged in the page image P1 of page 1 which is the previous page. Thus, the images I37, I38, and I42 included in the page image P3 are not replaced.

The image I41 included in the page image P2 (one page) set as page 3 is captured at 14:33 on May 14, 2018. The image I35 is captured at 10:28 on May 16, 2018. The image I36 is captured at 12:38 on May 16, 2018. The images I41, I35, and I36 are captured later than 13:57 on May 14, 2018 which is the last capturing date and time of the images I37, I38, and I42 arranged in the page image P3 which is the previous page. Thus, the images I41, I35, and I36 included in the page image P2 are also not replaced.

By executing steps up to step S87, the capturing dates and times of the images arranged in the album can be set in a time-series order. That is, extracted images can be arranged by prioritizing matching between a page order of the album and a time series of the capturing dates and times of the images over arrangement of the images based on layout information about the album.

In the above processing, processing of step S84 and processing of step S85 are separately performed. However, images arranged on one page may be replaced as one processing such that capturing dates and times of images arranged on one page of the album are later than the middle capturing date and time of capturing dates and times of images arranged on the previous page, and are earlier than the middle capturing date and time of capturing dates and times of images arranged on the subsequent page of one page.

In addition, instead of separately performing processing of step S86 and processing of step S87, images arranged on one page may be replaced as one processing such that capturing dates and times of images arranged on one page of the album are later than the last capturing date and time of images arranged on the previous page, and are earlier than the initial capturing date and time of images arranged on the subsequent page of one page.

Furthermore, while images are not arranged in accordance with the time series of the capturing dates and times of the images in one page of the album in the above example, the images extracted from the second image group may be arranged by prioritizing matching of the time series of the capturing dates and times of the images even in one page of the album. In this case, positions of regions formed in pages for pasting images and a time-series order of capturing dates and times are predetermined for each page, and the extracted images are arranged in accordance with the determined order.

Furthermore, in the above example, the images extracted from the second image group may be arranged in the album by prioritizing arrangement of the images based on the layout information about the album over matching between the page order of the album and the time series of the capturing dates and times of the images. In this case, arrangement of the images in the album may be finished in a state of temporary arrangement as described above, and processing described with reference to FIG. 14 to FIG. 17 may not be performed.

In addition, in arrangement of images in one page of the album, processing described with reference to FIG. 14 to FIG. 17 may be performed in a case where the images extracted in the second image group are arranged in the album by prioritizing arrangement of the images based on the layout information about the album over matching of the time series of the capturing dates and times of the images.

According to the first example, an album can be generated using a layout appropriate for images of the user among layouts in the past.

SECOND EXAMPLE

Figure 18:
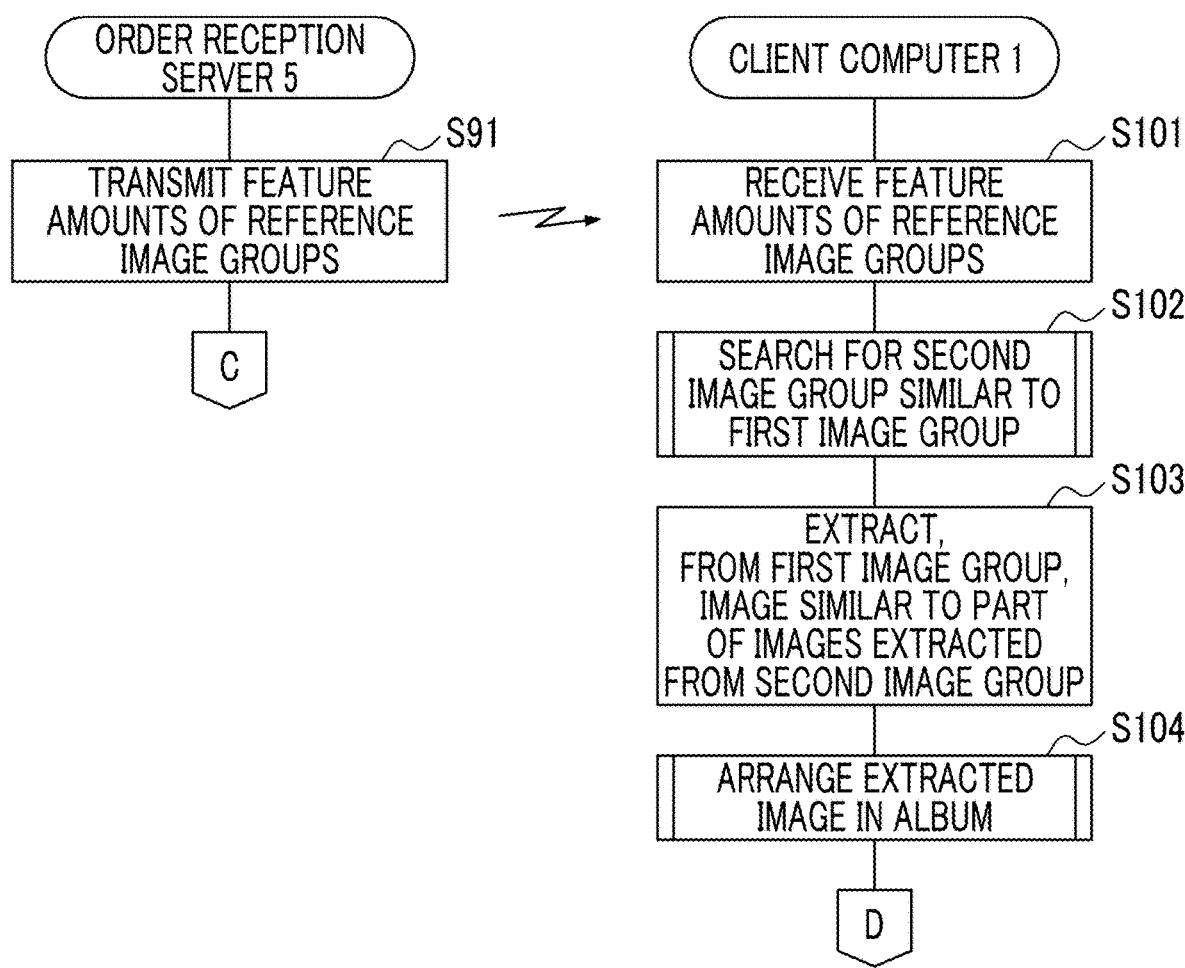
FIG. 18 is a flowchart illustrating a processing procedure of an image editing system.
Figure 19:
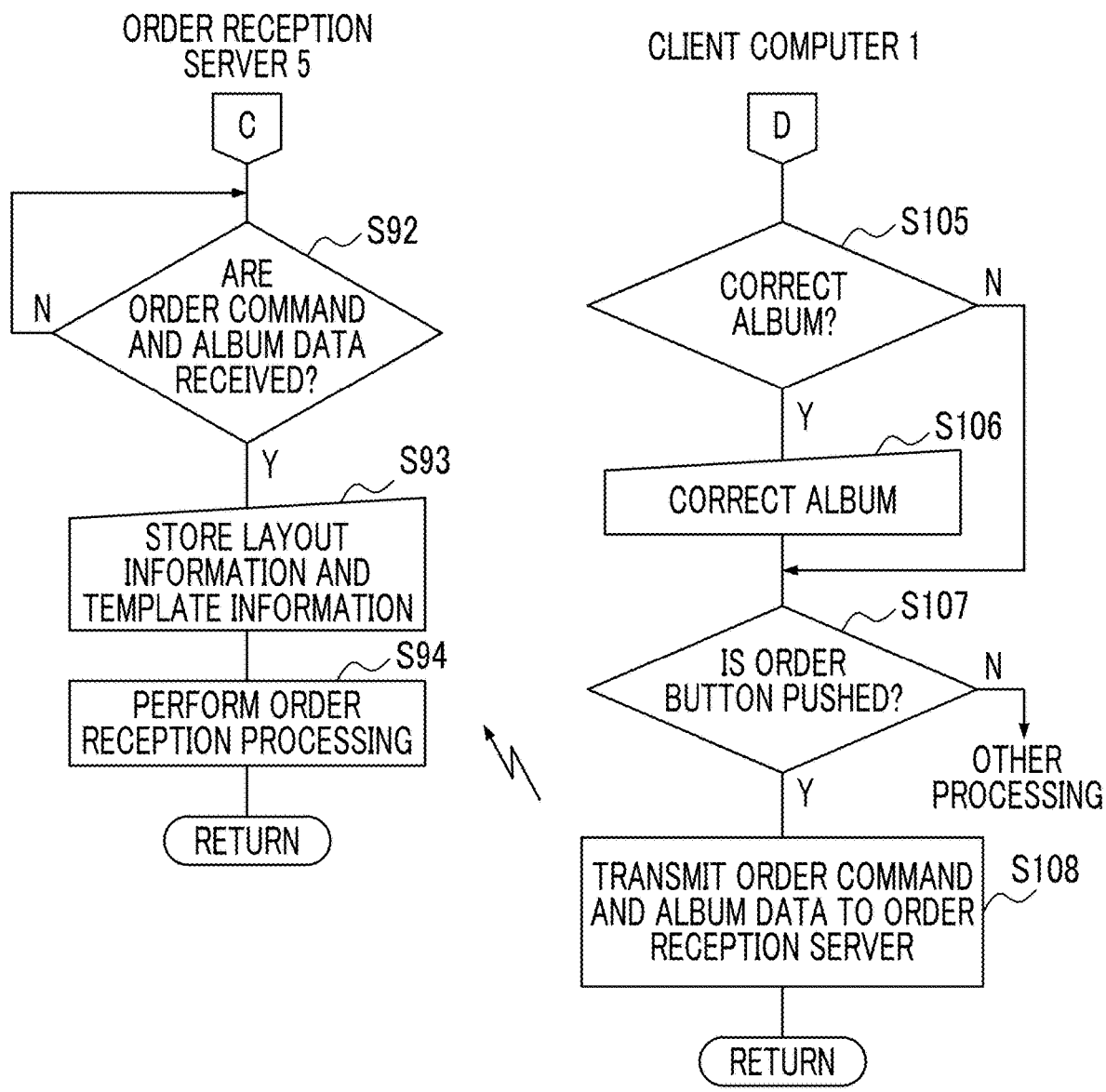
FIG. 19 is a flowchart illustrating a processing procedure of the image editing system.

FIG. 18 and FIG. 19 are flowcharts illustrating a processing procedure of the image processing system and illustrate processing procedures of the order reception server 5 and any client computer of the client computers 1 to n. Even in the second example, communication is performed between the client computer 1 and the order reception server 5 (in the second example, the client computer 1 is one example of the image processing apparatus).

Arrangement of images in the album (processing of step S14 in FIG. 5) in the order reception server 5 in the first example is performed in the client computer 1 in the second example.

As described above, the order reception database 6 connected to the order reception server 5 stores m number of layout information tables and in number of template information tables representing feature amounts of a plurality of reference image groups. The feature amounts of the plurality of reference image groups are transmitted to the client computer 1 from the order reception server 5 (step S91 in FIG. 18).

In a case where the feature amounts of the plurality of reference image groups transmitted from the order reception server 5 are received in the communication device 12 of the client computer 1 (step S101 in FIG. 18), the received feature amounts are temporarily stored in the memory 15.

The memory card 21 stores the first image group including a plurality of images to be used for generating an album. The first image group stored in the memory card 21 is read out by the memory card reader and writer 20 (a first image group reception device).

Feature amounts of the second image group similar to the first image group read out are searched by the CPU 10 (an image group search device) from the feature amounts of the plurality of reference image groups (step S102 in FIG. 18). In processing of step S102 in FIG. 18, the same processing as processing of step S52 in FIG. 5 is performed in the client computer 1. The second image group is substantially searched from the plurality of reference image groups. The feature amounts of the plurality of reference image groups include the layout information table. The layout information table includes the selection information indicating whether or not any of the reference image groups is selected as images to be used in the album. Thus, it can be said that the reference image groups have information about a part of images extracted from the reference image groups.

Next, images (for example, the images I21, I22, and I23 in FIG. 12) that are similar to a part of images (for example, the images I11, I12, and I13 in FIG. 11) extracted from the second image group are extracted from the first image group by the CPU 10 (a similar image extraction device) of the client computer 1 (step S103 in FIG. 18). In processing of step S103 in FIG. 18, the same processing as processing of step S53 in FIG. 5 as described above is performed in the client computer 1.

The images extracted from the first image group are arranged in the album as illustrated in FIG. 13 using the same layout as a layout of the second image group (step S104 in FIG. 18). In processing of step S104 in FIG. 18, the same processing as processing of step S54 in FIG. 5 as described above is performed in the client computer 1.

A content of the album in which the images extracted from the first image group are arranged is displayed on the display screen of the display device 11 of the client computer 1. The user checks the content. As a result of checking, in a case where the content of the album needs to be corrected (YES in step S105 in FIG. 19), the user performs correction (step S106 in FIG. 19).

In a case where the user of the client computer 1 pushes the order button (YES in step S107 in FIG. 19), the order command and the album data are transmitted to the order reception server 5 from the client computer 1 (step S108 in FIG. 19). As described above, the album data is data necessary for generating the album. The album in which the images extracted from the first image group are arranged on each page can be generated using the album data.

In a case where the order command and the album data transmitted from the client computer 1 are received in the order reception server 5 (YES in step S92 in FIG. 19), the received album data is analyzed by the CPU 30 of the order reception server 5, and the layout information and the template information are obtained. The layout information table and the template information table are newly generated from the obtained layout information and template information and are stored in the order reception database 6 (step S93 in FIG. 19). The order reception processing is performed by generating the album from the received album data (step S94 in FIG. 19).

In the second example, the album can be generated in the client computer 1 using a layout appropriate for images of the user among layouts in the past.

In the second example, the first image group is input in the client computer 1 (image processing apparatus) (client computer 1 comprises a first image group input device). The second image group similar to the first image group is searched from the plurality of reference image groups in the order reception server 5 (image group search server), images similar to a part of the images extracted from the second image group are extracted from the first image group by the CPU 10 (The similar image extraction device). However, the images similar to the part of the images extracted from the second image group may be extracted from the first image group in the order reception server 5. In this case, identification data of the second image group is transmitted to the order reception server 5, and the images similar to the part of the images extracted from the second image group are extracted from the first image group by the CPU 30 (The similar image extraction device) of the order reception server 5 based on information stored in the layout information table and the template information table.

THIRD EXAMPLE

Even in the third example, the image processing system in which the plurality of client computers 1 to n and the order reception server 5 communicate through the Internet is used in the same manner as the first example. In the third example, an example of creating an album of a wedding ceremony will be described. However, an album of an event or the like other than the wedding ceremony may also be created. Instead of an album, for example, application for pasting a plurality of images on one paper sheet can also be made. Any application can be made as long as a plurality of images are extracted from an image group (first image group Pg.).

Figure 20:
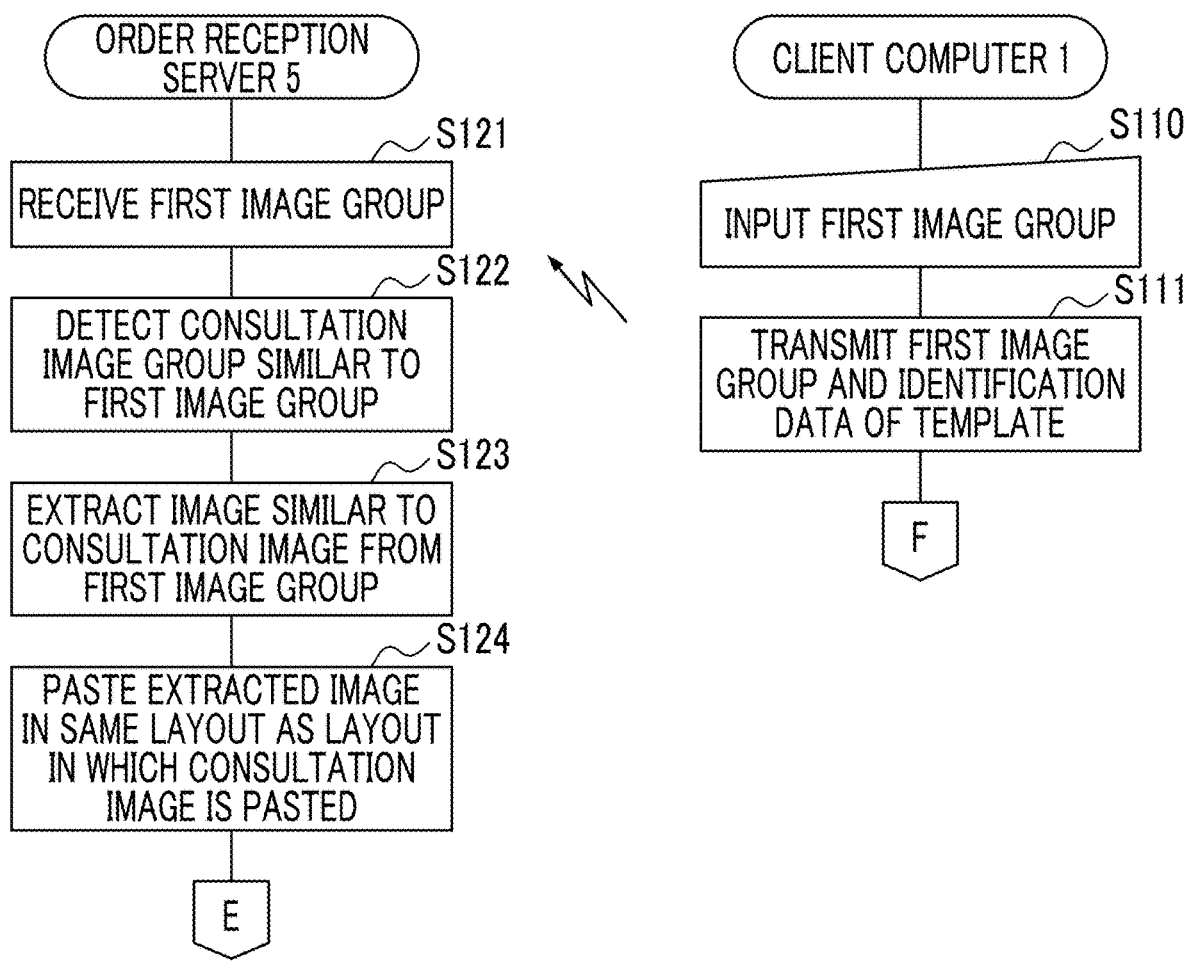
FIG. 20 is a flowchart illustrating a processing procedure of the image processing system.
Figure 21:
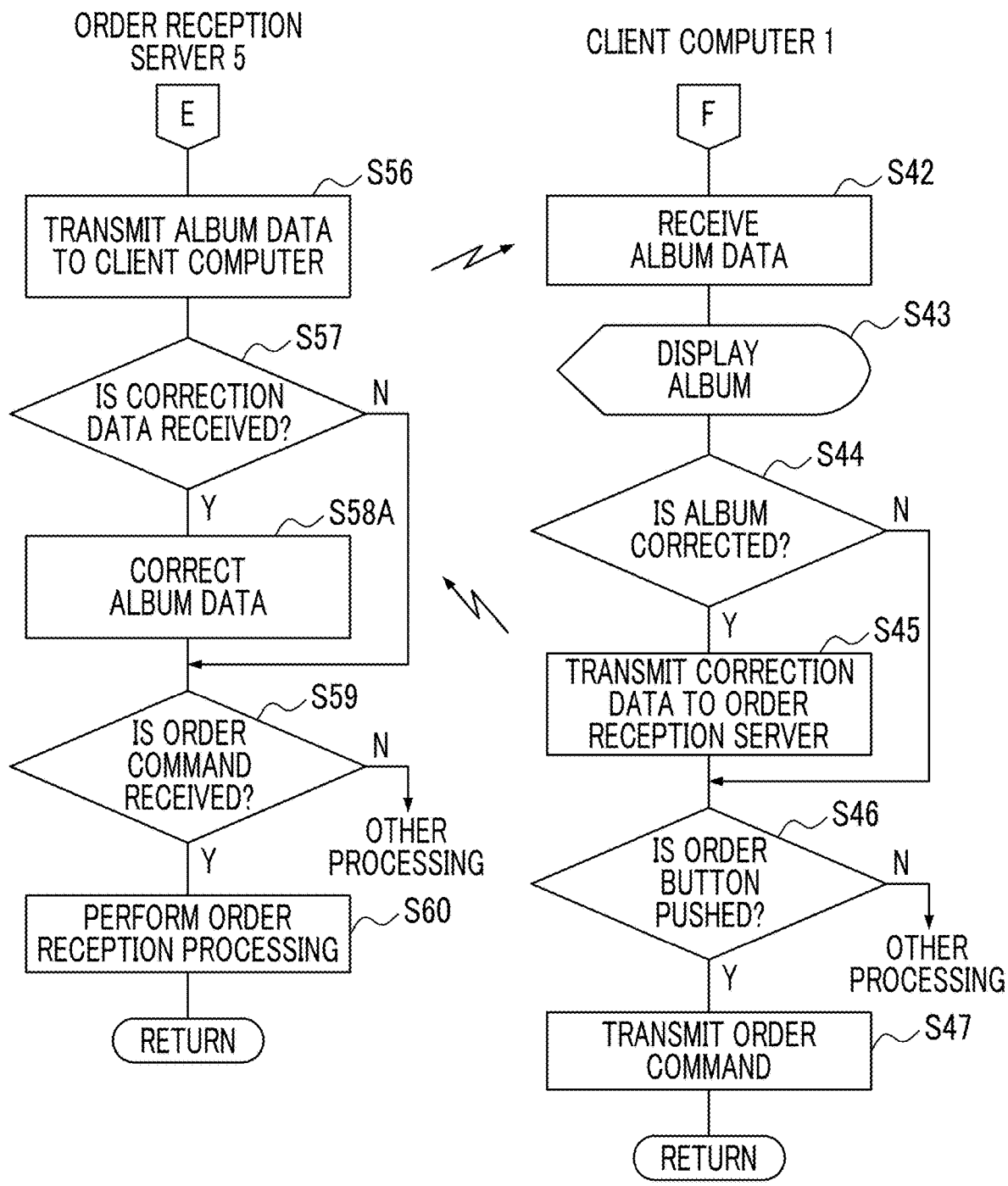
FIG. 21 is a flowchart illustrating a processing procedure of the image processing system.

FIG. 20 and FIG. 21 are flowcharts illustrating a processing procedure of the image processing system and illustrate processing procedures of the order reception server 5 and the client computer 1. Any client computer other than the client computer 1 among the client computers 1 to n can also be used. In this example, communication is performed between the client computer 1 and the order reception server 5 (in the third example, the order reception server 5 is one example of the image processing apparatus). In FIG. 21, the same processing as processing illustrated in FIG. 6 will be designated by the same reference sign, and description thereof will be omitted.

A plurality of image folders are formed in the memory card 21 (may be other recording media), and a plurality of images are stored in each of the plurality of image folders. An image folder in which images to be used in the album are stored is designated by the user. The user may be a bridegroom or a bride having a wedding ceremony or may be a business person such as an album creator. The plurality of images stored in the designated image folder are input from the memory card reader and writer 20 (one example of the first image group input device) as the first image group Pg (step S110) and are read out by the client computer 1. Data representing the plurality of images included in the first image group Pg is transmitted (transmission of the first image group Pg) to the order reception server 5 by the communication device 12 of the client computer 1 (step S111).

In a case where the data which represents the plurality of images and is transmitted from the communication device 12 of the client computer 1 is received (reception of the first image group Pg) in the communication device 31 (one example of the first image group input device) of the order reception server 5 (step S121), a consultation image group similar to the first image group Pg is detected from the order reception database 6 (step S122).

Figure 22:
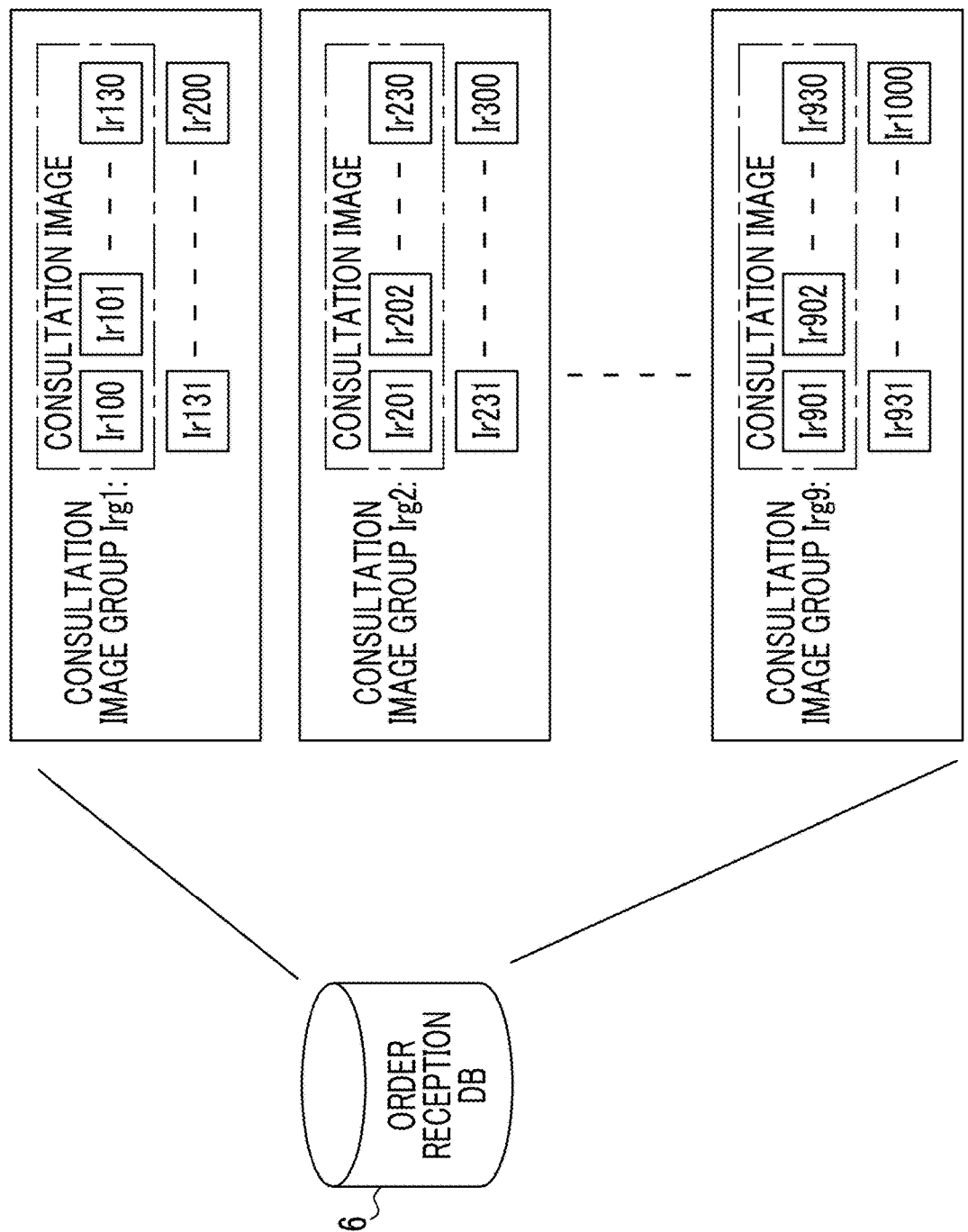
FIG. 22 illustrates a state of a plurality of consultation image groups stored in the order reception database.

FIG. 22 represents a state of a plurality of consultation image groups stored in the order reception database 6.

The order reception database 6 stores nine consultation image groups of consultation image groups Irg1 to Irg9 (less than nine consultation image groups may be stored, or more than nine consultation image groups may be stored). The consultation image group may be a collection of images stored in a case where an order of the album is previously received from the user, or may be a collection of images in a case where the album is created using sample images.

The consultation image group Irg1 includes a plurality of images Ir100 to Ir200. The album is created by extracting the image Ir100 to the image Ir130 among the images Ir100 to Ir200. The image Ir100 to the image Ir130 extracted from the consultation image group Irg1 will be referred to as consultation images. Similarly, the consultation image group Irg2 includes a plurality of images Ir201 to Ir300. The album is created by extracting the image Ir201 to the image Ir230 as the consultation images among the images Ir201 to Ir300. The same applies to other consultation image groups. In this example, the consultation image group Irg1 is detected as the consultation image group similar to the first image group Pg. Detection of the similar consultation image group can be implemented using a method described in the first example. Images (not only the consultation images hut also images included in the consultation image groups) included in the plurality of consultation image groups are distributed in a space corresponding to the feature amounts illustrated in FIG. 7, FIG. 9, FIG. 10, and the like, and the images included in the first image group Pg are distributed in a coordinate system. As a distance in the space between the image included in the consultation image group and the image included in the first image group Pg is decreased, similarity between the image groups is increased. A consultation image group for which the similarity is greater than or equal to a threshold value is the consultation image group similar to the first image group N. The threshold value may be predetermined or may be changed until a consultation image group most similar to the first image group Pg is obtained.

FIG. 23 illustrates each page of a consultation album Ab1.

Figure 24:
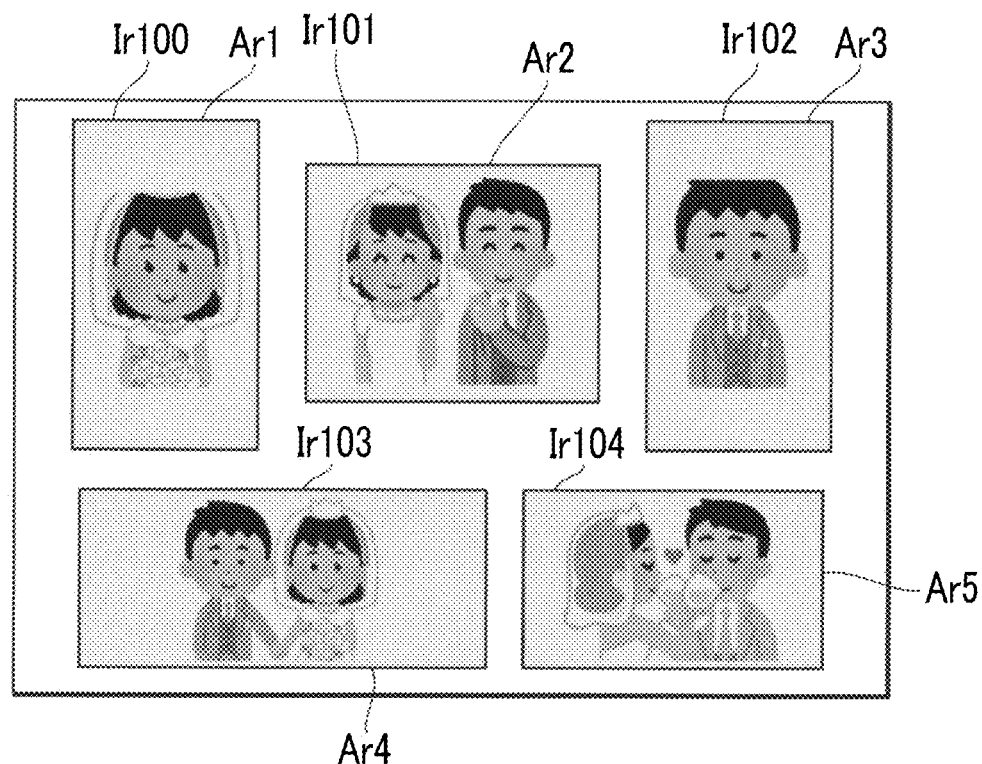
FIG. 24 illustrates a first page of a consultation album.

In the consultation album Ab1, the consultation images Ir100 to Ir130 are pasted in a template T1. The consultation album Ab1 has a first page to a sixth page. Image pasting regions Ar1 to Ar5 are defined on the first page as illustrated in FIG. 24. The consultation images Ir100 to Ir104 are pasted in the image pasting regions Ar1 to Ar5.

With reference to FIG. 23, the consultation images Ir105 to Ir109 are pasted on the second page, and the consultation images Ir126 to Ir130 are pasted on the sixth page. The same applies to other pages.

In a case where the consultation image group Irg1 similar to the first image group Pg is detected, images (images for which similarity is greater than or equal to a threshold value) similar to the consultation images Ir100 to Ir130 of the detected consultation image group Irg1 are extracted from the first image group Pg by the CPU 30 (one example of an extraction device) of the order reception server 5 (step S123). The threshold value may be predetermined or may be changed until a most similar image is obtained.

Figure 25:
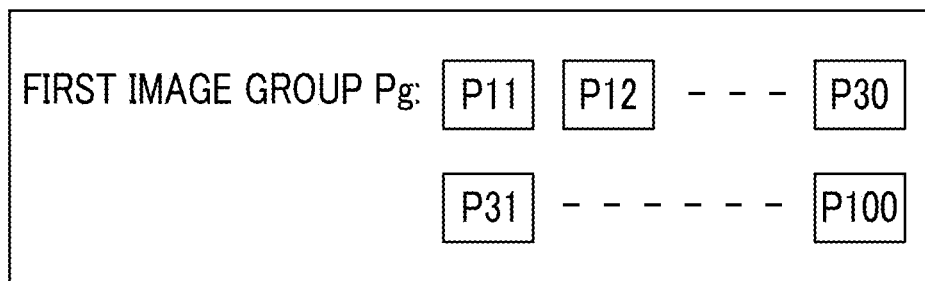
FIG. 25 is one example of images included in the first image group.

FIG. 25 is one example of images included in the first image group Pg.

The first image group Pg includes 90 images of an image P11 to an image P100.

Figure 26:
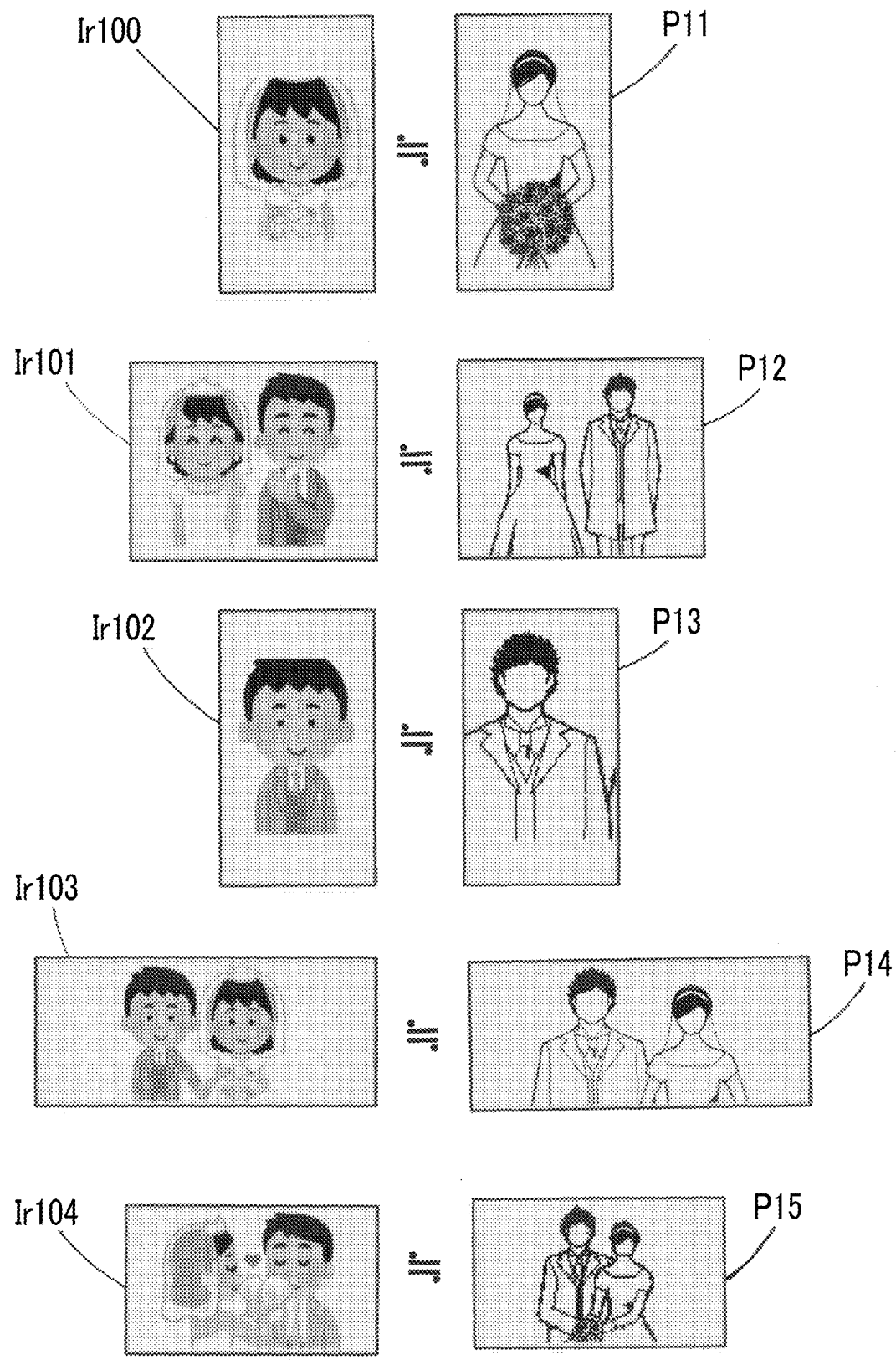
FIG. 26 illustrates consultation images and images similar to the consultation images.

FIG. 26 illustrates the consultation images Ir100 to Ir104 and the images P11 to P15 similar to the consultation images Ir100 to Ir104.

As described above, the consultation images Ir100 to Ir104 are included in the consultation image group Irg1, and the images P11 to P15 are included in the first image group Pg. The images P11, P12, P13, P14, and P15 are extracted from the first image group Pg as images similar to the consultation images Ir100, Ir101, Ir102, Ir103, and Ir104, respectively, that are pasted on the first page of the consultation album Ab1. The number of images extracted from the first image group Pg as the images similar to the consultation images may not be one and may be plural in correspondence with one consultation image. In a case of extracting one image from the first image group Pg in correspondence with one consultation image, an image having the highest similarity with one consultation image may be extracted from the first image group Pg. However, extraction may not necessarily be performed in such a manner. One image may be decided in a case of pasting in the image pasting region of the album.

Similarly, images are extracted from the first image group Pg for the consultation images Ir105 to Ir130 pasted on a page of the consultation album Ab1 other than the first page.

Figure 27:
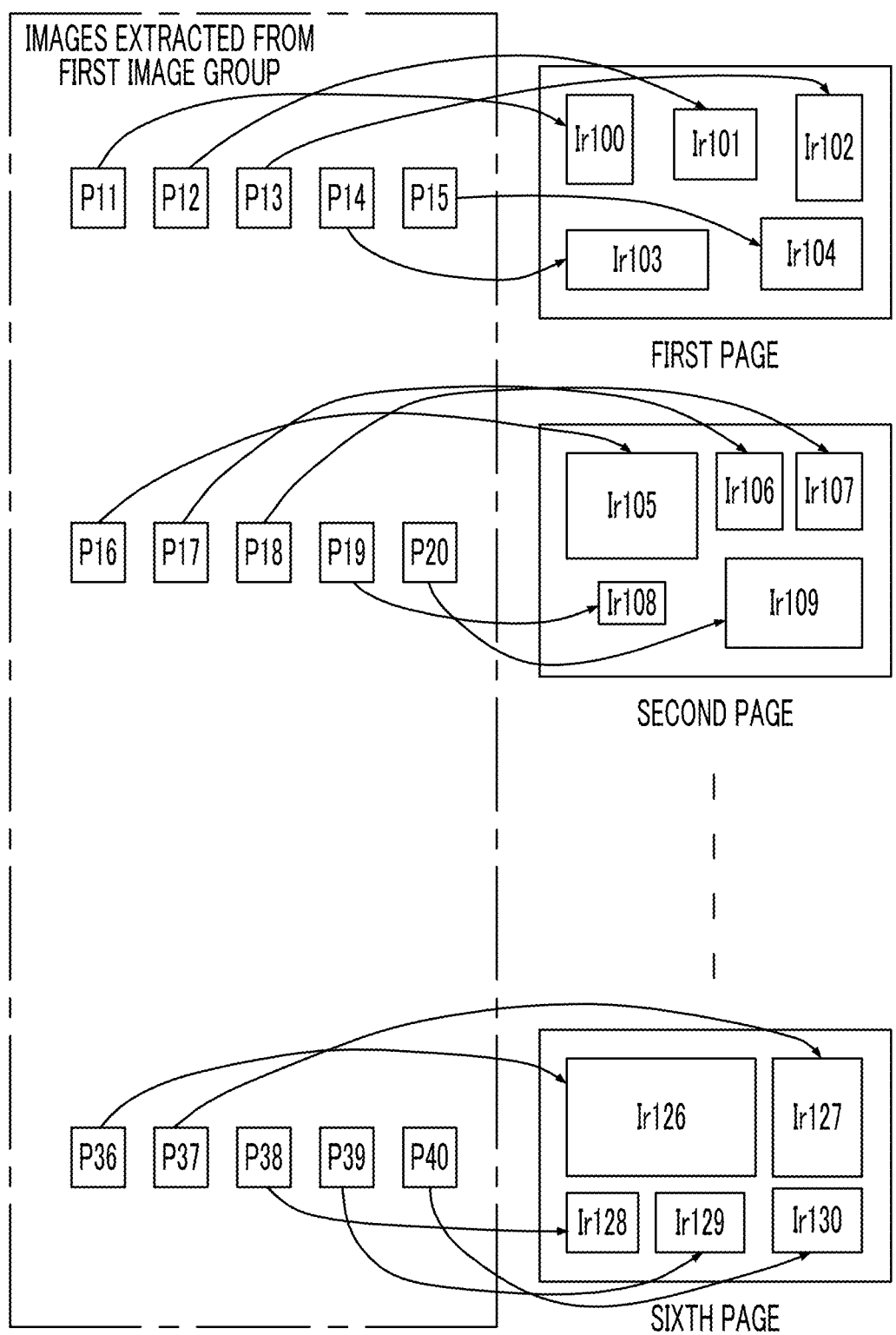
FIG. 27 illustrates a state where an image extracted from the first image group is pasted in the consultation album.

FIG. 27 illustrates a state where the images extracted from the first image group Pg are pasted in the consultation album Ab1.

For the first page of the consultation album Ab1, the images P11, P12, P13, P14, and P15 are extracted from the first image group Pg as images similar to the consultation images Ir100, Ir101, Ir102, Ir103, and Ir104, respectively. The images P11, P12, P13, P14, and P15 are pasted by the CPU 30 (one example of an image pasting device) of the order reception server 5 at respective positions of the image pasting regions Ar1, Ar2, Ar3, Ar4, and Ar5 in which the consultation images Ir100, Ir101, Ir102, Ir103, and Ir104 are pasted.

Figure 28:
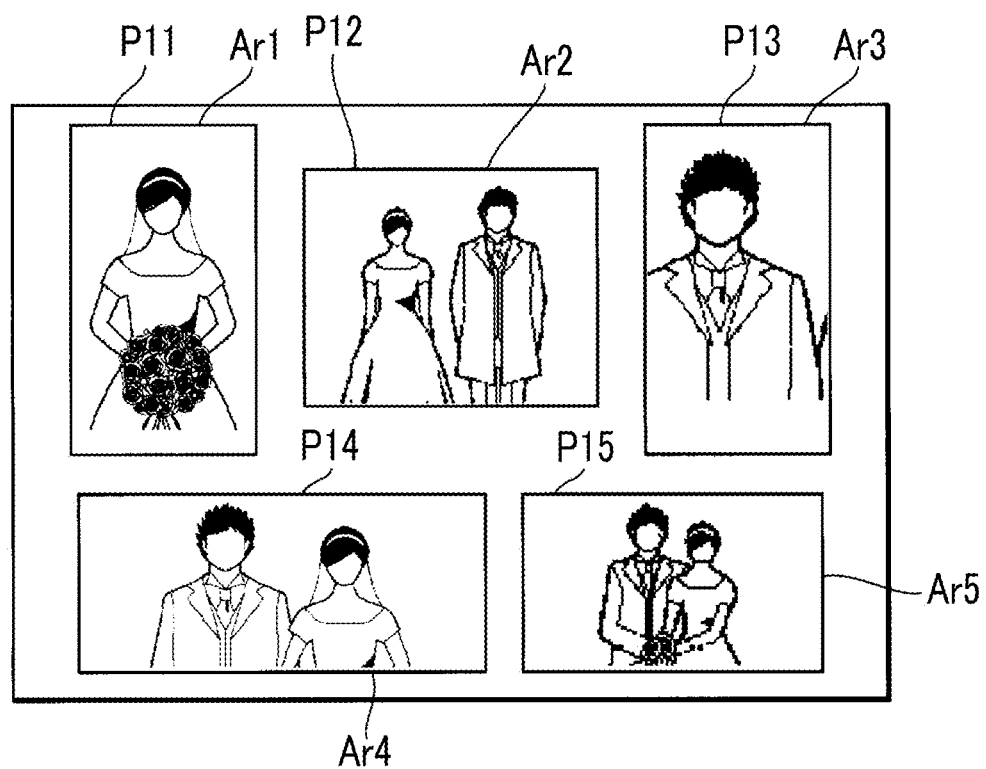
FIG. 28 illustrates a first page of an album.

FIG. 28 illustrates the first page of the album.

In FIG. 28, the images P11 to P15 are pasted in the image pasting regions Ar1 to Ar5, respectively, in the same manner as the consultation album Ab1 illustrated in FIG. 24. As is perceived by comparing FIG. 24 with FIG. 28, an album having the same impression as an impression of the first page of the consultation album Ab1 is obtained.

Returning to FIG. 27, the images P16, P17, P18, P19, and P20 are extracted from the first image group Pg as images similar to the consultation images Ir105, Ir106, Ir107, Ir108, and Ir109 that are pasted on the second page of the consultation album Ab1. The images P16, P17, P18, P19, and P20 are pasted at respective positions of image pasting regions in which the consultation images Ir105, Ir106, Ir107, Ir108, and Ir109 are pasted. The same processing is performed on other pages. The images P26, P27, P28, P29, and P30 are extracted from the first image group Pg as images similar to the consultation images Ir126, Ir127, Ir128, Ir129, and Ir130 that are pasted on the last sixth page of the consultation album Ab1. The images P36, P37, P38, P39, and P40 are pasted at respective positions of image pasting regions in which the consultation images Ir126, Ir127, Ir128, Ir129, and Ir130 are pasted.

The extracted images P11 to P40 are pasted in the same template T1 as the template T1 in which the consultation images Ir101 to Ir130 are pasted (step S124 in FIG. 20). Particularly, since the images similar to the consultation images are pasted at the positions of the image pasting regions in which the consultation images are pasted, the album in which the extracted images P1 to P30 are pasted is an album having the same finish as the consultation album Ab1 in which the consultation images Ir101 to Ir130 are pasted.

In a case where the album (electronic album) is generated, the album data representing the generated album is transmitted to the client computer 1 from the order reception server 5 (step S56 in FIG. 21).

In a case where the album data is received in the client computer 1 (step S42), the generated album is displayed (step S43). In a case where the album is corrected (step S44), the correction data is transmitted to the order reception server 5 from the client computer 1 (step S45).

In a case where the correction data is received in the order reception server 5 (YES in step S57), the album data is corrected (step S58A).

In a case where the order button is pushed in the client computer 1 (YES in step S46), the order command is transmitted to the order reception server 5 from the client computer 1 (step S47).

In a case where the order command transmitted from the client computer 1 is received in the order reception server 5 (YES in step S59), the order reception processing is performed (step S60).

The same images as the consultation images extracted from the consultation image group can be extracted from the first image group Pg, and the album having the same impression as the consultation album Ab1 can be relatively simply created using the images included in the first image group Pg.

MODIFICATION EXAMPLE

Figure 29:
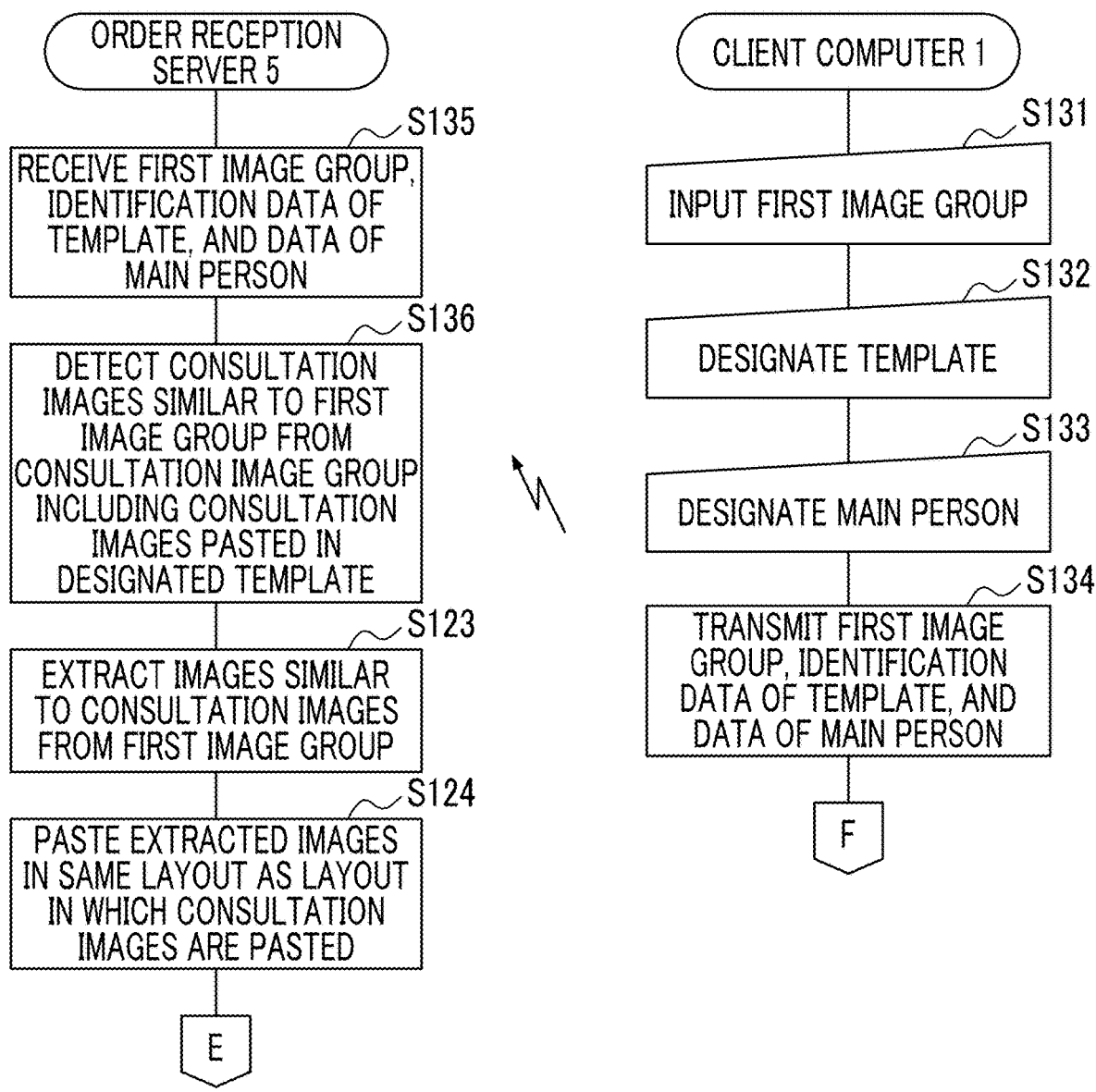
FIG. 29 is a part of a flowchart illustrating a processing procedure of the image processing system.

FIG. 29 is a part of a flowchart illustrating a processing procedure of the image processing system and corresponds to the processing procedure in FIG. 20. In FIG. 29, a part of the same processing as processing illustrated in FIG. 20 will be designated by the same reference sign.

As described above, in a case where the first image group Pg is input into the client computer 1 (step S131), the user designates a template to be used in the album (step S132). For example, in a case where the first image group Pg is input by starting an album creation program, a template designation window (not illustrated) is displayed on the display screen of the display device 11 of the client computer 1. Images (images showing contents of templates) of a plurality of templates are displayed in the template designation window, and an image of a desired template is selected by the mouse 17 (a template designation device). Then, the template is selected.

Next, the user designates a main person of the album (step S133).

Figure 30:
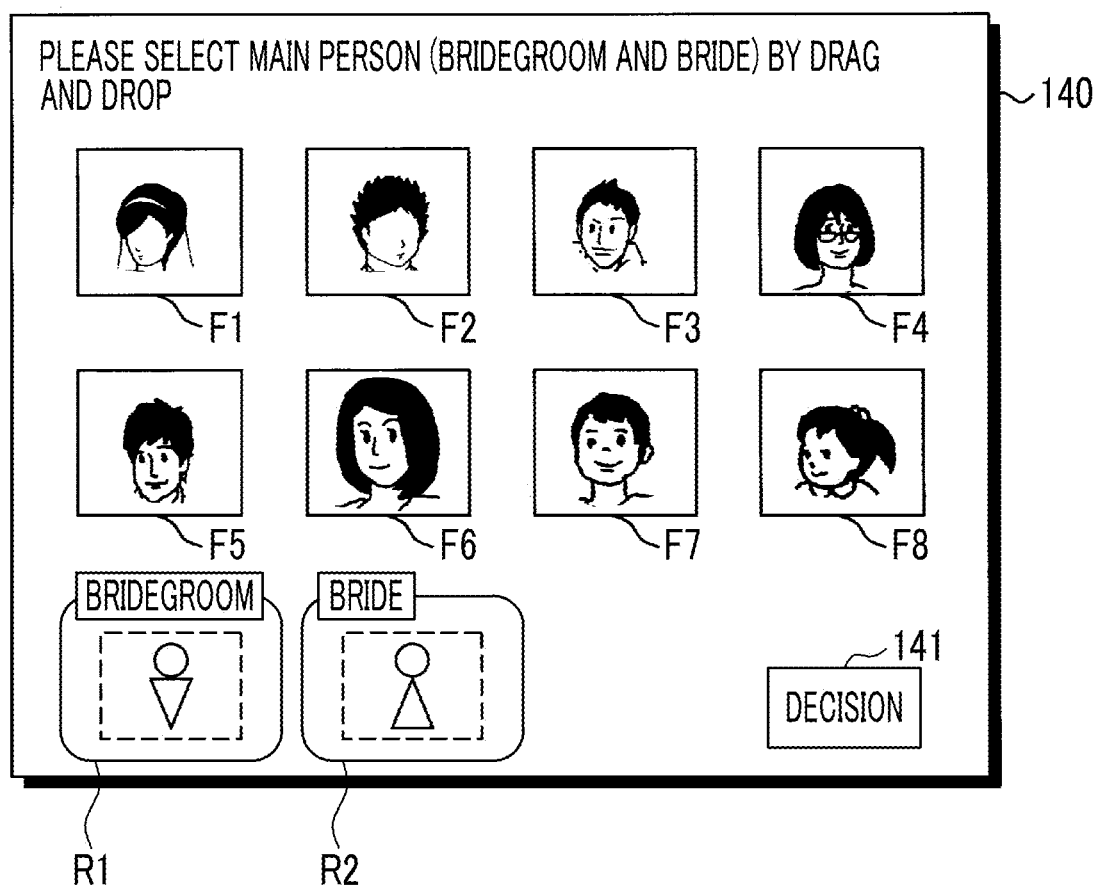
FIG. 30 is one example of a main person designation window.

FIG. 30 is one example of a main person designation window 140.

In a case where the first image group Pg is input into the client computer 1, face detection processing is performed from the plurality of images included in the first image group Pg by the CPU 10 of the client computer 1, and a face image that appears at a ratio of a certain frequency or higher is detected. Detected face images F1 to F8 are displayed in the main person designation window 140. A decision button 141 on which a text "decision" is displayed is formed at the lower right of the main person designation window 140. Instead of the face image appearing at a ratio of a certain frequency or higher, all face images detected in the face detection processing may be displayed in the main person designation window 140. In a case where a face image desired to be set as a main person by the user among the face images F1 to F8 is clicked by the mouse 17 and the decision button 141 is pushed, a person of the clicked face image is set as the main person. The number of main persons may be one or two or more.

The present examples are examples related to the album of the wedding ceremony. Thus, as illustrated in FIG. 30, a region R1 for designating a face of the bridegroom and a region R2 for designating a face of the bride as the main person are disposed. In a case of specifying the bridegroom, the user drags and drops a face image to be specified as the bridegroom in the region R1 among the face images F1 to F8 (in a case where other face images are present, the other face images are displayed by scrolling). In a case of specifying the bride, the user drags and drops a face image to be specified as the bride in the region R2 among the face images F1 to F8. Accordingly, the bridegroom and the bride can be specified. Face images of persons estimated to be the bridegroom and the bride may be displayed in advance by person recognition (of a person who appears multiple times) or object recognition (of clothes and the like normally worn by the bridegroom and the bride).

In the present example, a person specified as the bridegroom and a person specified as the bride are distinguished as persons having roles of the bridegroom and the bride. In the following description, in a case of creating the album of the wedding ceremony, the term main person is used for a contrast between an example bridegroom and the bridegroom in the first image group Pg and also a contrast between an example bride and the bride in the first image group Pg.

In a case where the main person is designated, the first image group Pg input into the client computer 1, identification data of the designated template, and data (face image data) representing the main person are transmitted to the order reception server 5 from the client computer 1 (step S134).

In a case where the first image group Pg, the identification data of the designated template, and the data (face image data) representing the main person transmitted from the client computer 1 are received in the order reception server 5 (step S135), a consultation image group similar to the first image group is detected by the CPU 30 (one example of a consultation image group detection device) of the order reception server 5 from consultation image groups including the consultation images pasted in the designated template among the consultation image groups stored in the order reception database 6 (step S136). For example, even in a case where the first image group Pg and the consultation image group Irg1 are similar as described above (even in a case where the similarity is greater than or equal to the threshold value), the consultation image group Irg1 is not extracted as the consultation image group similar to the first image group Pg in a case where the designated template is not used in the consultation album Ab1 generated using the consultation images included in the consultation image group Irg1.

In a case where the consultation image group is extracted, as described above, images similar to the consultation images included in the extracted consultation image groups are extracted from the first image group Pg (step S123) (extraction processing of the similar images will be described later), and the album is generated by pasting the extracted images in the same template as the template (designated template) in which the consultation images are pasted (step S124).

Figure 31:
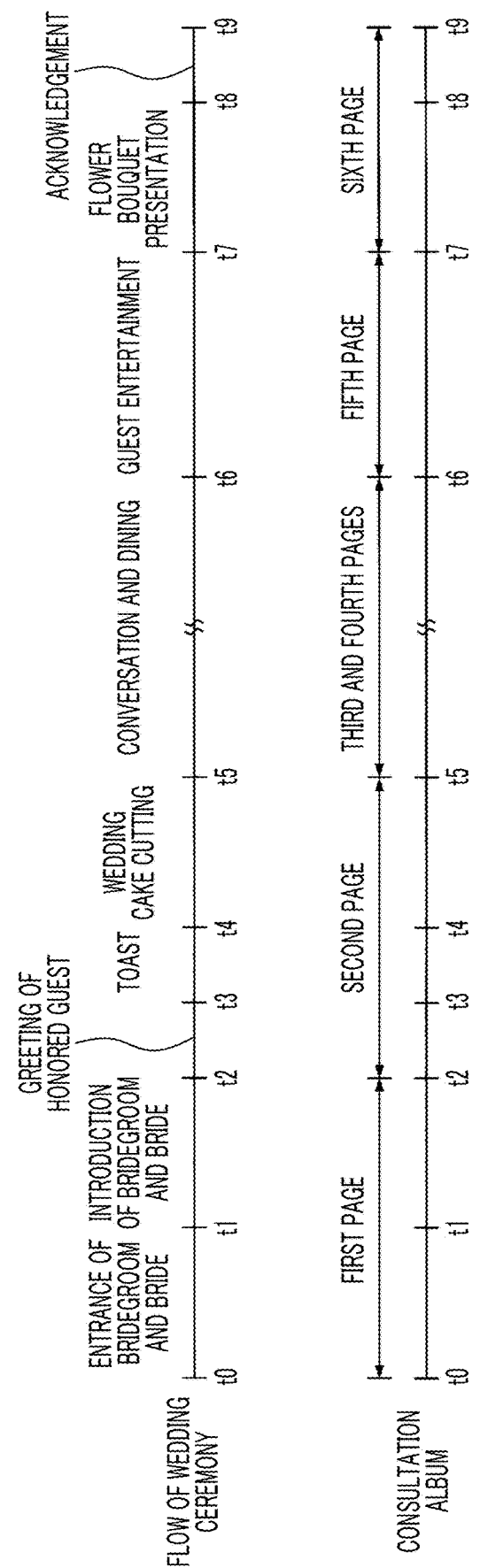
FIG. 31 illustrates a flow and the like of wedding ceremony.

FIG. 31 illustrates a relationship between a flow of wedding ceremony and timings at which the consultation images Ir100 to Ir130 pasted on each page of the consultation album Ab1 are captured at the wedding ceremony.

For example, the wedding ceremony is started at time t0, and the bridegroom and the bride enter until time t1. The bridegroom and the bride are introduced from time t1 to time t2, and greeting of an honored guest is performed from time t2 to time t3. A toast is made from time t3 to time t4. A wedding cake is cut from time t4 to time t5. Conversation and dining are performed from time t5 to time t6. Guest entertainment is performed from time t6 to time t7. Flower bouquets are presented to parents from time t7 to time t8. Acknowledgement of the bridegroom and the bride is performed from time t8 to time t9. In an event such as the wedding ceremony, a general flow is determined, and a target captured in each time range is also determined.

Consultation images of contents following the flow in the event are pasted in the consultation album. For example, consultation images corresponding to "entrance of the bridegroom and the bride" performed from time t0 to time t1 and consultation images (Ir100 to Ir104) corresponding to "introduction of the bridegroom and the bride" are pasted on the first page of the consultation album Ab1. Similarly, consultation images corresponding to "greeting of the honored guest", consultation images (Ir105 to Ir109) corresponding to "toast", and consultation images corresponding to "wedding cake cutting" are pasted on the second page of the consultation album Ab1. Consultation images corresponding to "conversation and dining" are pasted on the third page and the fourth page of the consultation album Ab1. Consultation images corresponding to "guest entertainment" are pasted on the fifth page of the consultation album. Consultation images corresponding to "flower bouquet presentation" and consultation images (Ir126 to Ir130) corresponding to "acknowledgement" are pasted on the sixth page of the consultation album Ab1.

A capturing time is recorded in a header of an image file. Thus, a capturing timing at which the image is captured is perceived by consulting the capturing time. Among the images included in the first image group Pg, the similarity can be corrected to be increased for an image having the same capturing timing as a capturing timing of the consultation image included in the consultation image group similar to the first image group Pg, and the similarity can be corrected to be decreased for an image having a different capturing timing as the capturing timing of the consultation image included in the consultation image group similar to the first image group Pg. An image having the highest corrected similarity can be displayed in a selected image display region 90.

In a case where images similar to the consultation images among the images included in the first image group Pg are simply extracted and pasted in the image pasting regions of the album, images not corresponding to a scene may be pasted. For example, the consultation images Ir100 to Ir104 illustrated in FIG. 21 are images on the first page and thus, are consultation images corresponding to a scene of "entrance of the bridegroom and the bride" from time t0 to time t1 and a scene of "introduction of the bridegroom and the bride" from time t1 to time t2. In this case, in a case where images that are similar to the consultation images Ir100 to Ir104 but are captured at timings which are not timings from time t0 to time t2, for example, timings from time t8 to time t9, are pasted on the first page, the generated album does not correspond to the flow of wedding ceremony. Thus, in this example, an image that is captured at a timing at which an image similar to the consultation image is expected to be captured is pasted in the image pasting region corresponding to the image pasting region in which the consultation image is pasted.

As illustrated in FIG. 26, even in a case where it is determined that the consultation image Ir103 is similar to the image P4, the image P4 is not pasted on the first page in a case where the image P4 is captured at a timing from time t7 to time t8, because the consultation image Ir103 is pasted on the first page and images having the capturing timing from time t0 to time t2 are pasted on the first page. For example, the image is pasted in any of the image pasting regions of the consultation images Ir126 to Ir130 pasted on the sixth page illustrated in FIG. 27.

Figure 32:
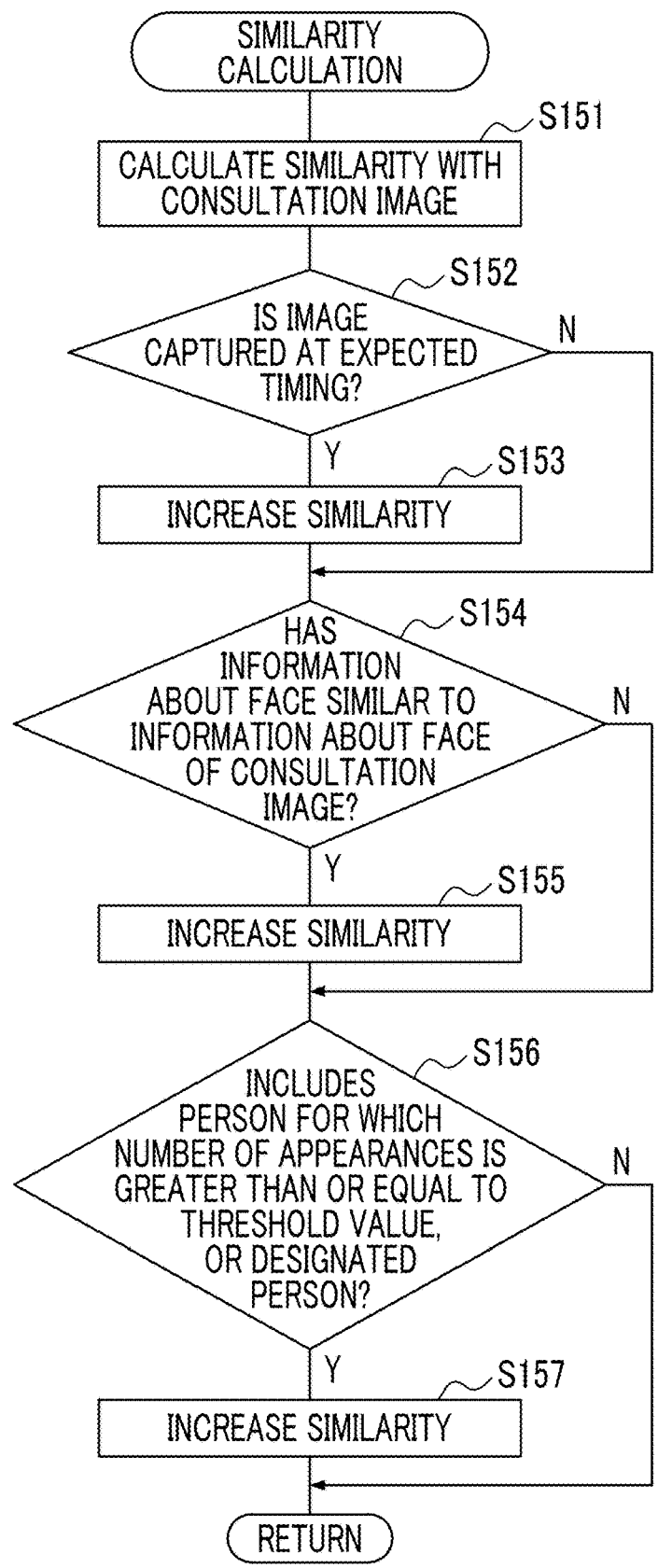
FIG. 32 illustrates a similarity calculation processing procedure.

FIG. 32 is a flowchart illustrating a processing procedure of similarity calculation processing (part of processing in step S123 in FIG. 29).

The similarity calculation processing illustrated in FIG. 32 is performed on all images of the plurality of images included in the first image group. Similarity between the image included in the first image group and the consultation image stored in the order reception database 6 is calculated for all combinations of the images included in the first image group and the consultation images stored in the order reception database 6 (step S151).

In a case where an expected capturing timing of the consultation image matches the capturing timing of the image included in the first image group, it is determined that the image included in the first image group is captured at the expected timing (YES in step S152), and the CPU 30 (one example of a first similarity adjustment device) of the order reception server 5 increases the similarity. The similarity may also be increased in a case where an order of the consultation images pasted in the consultation album matches a capturing order of the images.

Next, the CPU 30 (one example of a second similarity adjustment device) of the order reception server 5 also increases the similarity for an image having information similar to information about a face of the consultation image (YES in step S154). The information about the face is information obtained from the face and is information about similarity of the face, information about the number of faces, or the like. For example, in a case where it is considered that the number of faces (faces considered as main subjects) included in the images is almost the same, the CPU 30 of the order reception server 5 increases the similarity (step S155). In a case where the consultation album generated using the consultation images included in the consultation image group is an album generated in the past by the user, the same album may be generated later. In this case, a new album that is the same as the album in the past can be generated by increasing the similarity of an image similar to an image of the face included in the consultation image pasted in the album in the past.

The number of appearances of a person is detected for the plurality of images included in the first image group Pg by the CPU 30. For an image for which the number of appearances is greater than or equal to a threshold value, or an image of a person designated as the main person (YES in step S156), the CPU 30 (one example of a third similarity adjustment device and a fourth similarity adjustment device) of the order reception server 5 increases the similarity (step S157).

An image for which the adjusted similarity is greater than or equal to the threshold value is set as the image similar to the consultation image. Since the similarity is adjusted, a more appropriate album is generated.

In the above examples, images to be displayed are selected and displayed in accordance with a degree of similarity in a recommended image display region 101 and in accordance with a time series in a time-series image list display region 102. However, other selection methods and display methods may also be employed. For example, in the recommended image display region 101, an image to be displayed is selected in accordance with the degree of similarity in a case where a degree of matching of the capturing tinting is not considered. However, a display method such as providing a mark indicating preference near an image for which the degree of matching of the capturing timing is greater than a threshold value may be employed. In addition, for example, while selection of an image to be displayed in accordance with the time series in the time-series image list display region 102 is not changed from the above examples, a display method such as providing a mark indicating preference near an image for which the similarity with an image displayed in an example image display region 80 is greater than the threshold value may be employed.

While the album of the wedding ceremony is created in the above examples, an album other than the album of the wedding ceremony may be created by consulting an example album. For example, an album summarizing school events for one year may be created. In this case, events performed for one year are generally performed in the same time period each year. Thus, the similarity of images captured in the same time period may be increased even in a case where a new album is created using an album created one year ago as an example.

While the bridegroom and the bride among the main persons are distinguished as different roles in the above examples, a plurality of main persons may be handled without distinction depending on a creation purpose of the album. That is, in a case where the number of main persons appearing in the example album is k (k is a natural number) and the number of main persons in the first image group Pg is specified as m (m is a natural number), the similarity between an image in which any of k persons is captured and an image in which any of m persons is captured can be increased by handling the images as images in which the main persons are captured, regardless of who is captured among k persons and who is captured among in persons.

While image extraction processing and the like are mainly performed in the order reception server 5 in the above examples, the above processing of the order reception server 5 may be performed in the client computer 1 (image processing apparatus) in a case where the consultation image groups are stored in the client computer 1. In this case, it can be configured that a tablet terminal, a smartphone, a dedicated image processing apparatus, or the like is used instead of the client computer 1.

While the album is generated using the images extracted from the first image group in the above examples, the invention is not limited to a case of generating the album and can also be used in a case where a shuffle print in which a plurality of images are pasted on an image product such as one paper sheet is made, a case where an image is extracted from a plurality of images and the extracted image is printed one sheet at a time, and the like.

Processing units executing the above processing include not only the CPU 10 of the client computer 1 and the CPU 30 of the order reception server 5 functioning as various processing units by executing software, but also a programmable logic device such as a field-programmable gate array (FPGA) having a circuit configuration changeable after manufacturing, a dedicated electric circuit such as an application specific integrated circuit (ASIC) that is a processor having a circuit configuration dedicatedly designed to execute a specific type of processing, and the like.

One processing unit may be configured with one of various processors or may he configured with a combination of two or more processors of the same type or different types (for example, a plurality of FPGAs or a combination of a CPU and an FPGA). As an example of configuring a plurality of processing units with one processor, first, a form in which, as represented by a computer such as a client computer or a server, one processor is configured with a combination of one or more CPUs and software and this processor functions as a plurality of processing units is available. Second, a form in which, as represented by a system on chip or the like, a processor that implements a function of the entire system including a. plurality of processing units in one integrated circuit (IC) chip is used is available. Accordingly, various processing units are configured using one or more of various processors as a hardware structure.

Furthermore, the hardware structure of various processors is more specifically an electric circuit in which circuit elements such as semiconductor elements are combined.

What is claimed is:

1. An image processing apparatus comprising:
    a reference image group reception device that receives an input of a plurality of reference image groups;
    a first image extraction device that extracts a part of images from each of the plurality of reference image groups;
    a first image group reception device that receives an input of a first image group;
    an image group search device that searches for a second image group similar to the first image group from the plurality of reference image groups; and
    a second image extraction device that extracts, from the first image group, an image similar to the part of the images extracted from the second image group.

2. The image processing apparatus according to claim 1, wherein extraction in the first image extraction device is processing used for arranging the extracted part of the images in an album, and
    the image processing apparatus further comprises an image arrangement device that arranges, in the album, the image extracted in the second image extraction device.

3. The image processing apparatus according to claim 2, wherein the image arrangement device arranges, in the album, the image extracted in the second image extraction device based on information about an album in which the part of the images extracted from the second image group is arranged.

4. The image processing apparatus according to claim 3, wherein the information about the album is at least one of layout information about the album or template information about the album.

5. The image processing apparatus according to claim 4, wherein the image arrangement device arranges, in the album, the image extracted in the second image extraction device by prioritizing matching between a page order of the album and a time series of a capturing date and time of the image over arrangement of the image based on the layout information about the album.

6. The image processing apparatus according to claim 5, further comprising:
    a rearrangement device that obtains a middle capturing date and time of capturing dates and times of images arranged on each page of the album and rearranges the pages of the album such that the middle capturing date and time are in a time-series order.

7. The image processing apparatus according to claim 6, further comprising:
    a first image replacement device that replaces an image arranged on one page with another image such that a capturing date and time of the image arranged on one page of the album is earlier than the middle capturing date and time of capturing dates and times of images arranged on subsequent pages.

8. The image processing apparatus according to claim 6, further comprising:
    a second image replacement device that replaces an image arranged on one page with another image such that a capturing date and time of the image arranged on one page of the album is later than the middle capturing date and time of capturing dates and times of images arranged on previous pages.

9. The image processing apparatus according to claim 6, further comprising:
    a third image replacement device that replaces an image arranged on one page with another image such that a capturing date and time of the image arranged on one page of the album is earlier than an initial capturing, date and time of images arranged on subsequent pages.

10. The image processing apparatus according to claim 6, further comprising:
    a fourth image replacement device that replaces an image arranged on one page with another image such that a capturing date and time of the image arranged on one page of the album is later than a last capturing date and time of images arranged on previous pages.

11. The image processing apparatus according to claim 3, wherein the image arrangement device arranges, in the album, the image extracted in the second image extraction device by prioritizing matching of a time series of a capturing date and time of the image over arrangement of the image based on layout information about the album for arrangement of the image in one page of the album.

12. The image processing apparatus according to claim 3, wherein the image arrangement device arranges, in the album, the image extracted in the second image extraction device by prioritizing arrangement of the image based on layout information about the album over matching between a page order of the album and a time series of a capturing date and time of the image.

13. The image processing apparatus according to claim 3, wherein the image arrangement device arranges, in the album, the image extracted in the second image extraction device by prioritizing arrangement of the image based on layout information about the album over matching of a time series of a capturing date and time of the image for arrangement of the image in one page of the album.

14. The image processing apparatus according to claim 1, wherein the image group search device, in each reference image group of the plurality of reference image groups, divides images included in the reference image group into a first small group collection of similar images, divides images included in the first image group into a second small group collection of similar images, and searches for a reference image group for which a degree of matching between the first small group collection and the second small group collection is greater than or equal to a first threshold value as the second image group similar to the first image group.

15. The image processing apparatus according to claim 14,
wherein the image group search device combines small groups in a case where similarity between small groups included in the first small group collection is greater than or equal to a second threshold value, and combines small groups in a case where similarity between small groups included in the second small group collection is greater than or equal to the second threshold value.

16. An image processing apparatus comprising:
a first image group reception device that receives an input of a first image group;
an image group search device that searches for a second image group similar to the first image group from a plurality of reference image groups each having information about an extracted part of images; and
an image extraction device that extracts, from the first image group, an image similar to the part of the images extracted from the second image group searched by the image group search device.

17. An image processing system comprising:
an image processing apparatus; and
an image group search server,
wherein the image processing apparatus includes a first image group reception device that receives an input of a first image group,
the image group search server includes an image group search device that searches for a second image group similar to the first image group from a plurality of reference image groups each having information about an extracted part of images, and
at least one of the image processing apparatus or the image group search server includes an image extraction device that extracts, from the first image group, an image similar to the part of the images extracted from the second image group searched by the image group search device.

18. An image processing method comprising:
receiving, by a reference image group reception device, an input of a plurality of reference image groups;
extracting, by a first image extraction device, a part of images from each of the plurality of reference image groups;
receiving, by a first image group reception device, an input of a first image group;
searching, by an image group search device, for a second image group similar to the first image group from the plurality of reference image groups; and
extracting, by a second image extraction device, from the first image group, an image similar to the part of the images extracted from the second image group.

19. An image processing method comprising:
receiving, by a first image group reception device, an input of a first image group;
searching, by an image group search device, for a second image group similar to the first image group from a plurality of reference image groups each having information about an extracted part of images; and
extracting, by an image extraction device, from the first image group, an image similar to the part of the images extracted from the second image group searched by the image group search device.

20. A non-transitory recording medium storing a computer-readable program controlling a computer of an image processing apparatus, the program controlling the computer of the image processing apparatus to perform:
receiving an input of a. plurality of reference image groups;
extracting a part of images from each of the plurality of reference image groups;
receiving an input of a first image group;
searching for a second image group similar to the first image group from the plurality of reference image groups; and
extracting, from the first image group, an image similar to the part of the images extracted from the second image group.

21. A non-transitory recording medium storing a computer-readable program controlling a computer of an image processing apparatus, the program controlling the computer of the image processing apparatus to perform:
receiving an input of a first image group;
searching for a second image group similar to the first image group from a plurality of reference image groups each having information about an extracted part of images; and
extracting, from the first image group, an image similar to the part of the images extracted from the searched second image group.

* * * * *